United States Patent
Grassadonia et al.

(10) Patent No.: US 11,348,083 B1
(45) Date of Patent: *May 31, 2022

(54) PAYMENT BY USE OF IDENTIFIER

(71) Applicant: Block, Inc., San Francisco, CA (US)

(72) Inventors: Brian Grassadonia, San Francisco, CA (US); Ajit Kalidindi Varma, San Francisco, CA (US); Mark Jen, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 15/675,099

(22) Filed: Aug. 11, 2017

Related U.S. Application Data

(63) Continuation of application No. 14/502,703, filed on Sep. 30, 2014, now Pat. No. 9,741,026.

(51) Int. Cl.
   *G06Q 20/00* (2012.01)
   *G06Q 20/20* (2012.01)
   (Continued)

(52) U.S. Cl.
   CPC ........... *G06Q 20/204* (2013.01); *G06Q 20/10* (2013.01); *G06Q 20/42* (2013.01)

(58) Field of Classification Search
   CPC ...... G06Q 20/00; G06Q 20/204; G06Q 20/42; G06Q 20/10
   (Continued)

(56) References Cited

U.S. PATENT DOCUMENTS 5,870,723 A  2/1999  Pare, Jr. et al.
5,960,411 A  9/1999  Hartman et al.
(Continued)

FOREIGN PATENT DOCUMENTS

AU  2017228647 A1  10/2017
CA  2 906 524 A1   9/2014
(Continued)

OTHER PUBLICATIONS

Non-Final Office Action dated Jun. 16, 2016, for U.S. Appl. No. 14/502,703, of Grassadonia, B., et al., filed Sep. 30, 2014.
(Continued)

*Primary Examiner* — Russell S Glass
(74) *Attorney, Agent, or Firm* — Lee & Hayes, P.C.

(57) ABSTRACT

Described is a technology that enables a customer, who uses a payment card in a transaction and further provides an identifier in the same transaction, to use the identifier as a payment mechanism in all future transactions. In some embodiments, the technology involves communication between a customer's user device, a payment service system (PSS), and one or more merchant POS systems. A merchant POS system collects information in a transaction conducted between the merchant POS system and the customer, including, among others, the customer's contact information (e.g., telephone number), and forwards this information to the PSS. The PSS stores the information as an identifier, where the identifier is stored in association with the card used in the transaction. In a second transaction, the PSS sends a verification request to the user device based on the identifier (e.g., a text message), and processes the transaction only upon confirmation from the customer.

20 Claims, 11 Drawing Sheets

(51) Int. Cl.
  *G06Q 20/42* (2012.01)
  *G06Q 20/10* (2012.01)
(58) Field of Classification Search
  USPC .......................................................... 705/17
  See application file for complete search history.

(56) References Cited

U.S. PATENT DOCUMENTS

| | | | |
|---|---|---|---|
| 6,167,517 | A | 12/2000 | Gilchrist et al. |
| 6,192,142 | B1 | 2/2001 | Pare, Jr. et al. |
| 6,243,689 | B1 | 6/2001 | Norton |
| 6,310,966 | B1 | 10/2001 | Dulude et al. |
| 6,532,541 | B1 | 3/2003 | Chang et al. |
| 6,705,520 | B1 | 3/2004 | Pitroda et al. |
| 6,738,749 | B1 | 5/2004 | Chasko |
| 6,760,841 | B1 | 7/2004 | Fernandez |
| 6,763,399 | B2 | 7/2004 | Margalit et al. |
| 7,020,778 | B1 | 3/2006 | Miettinen et al. |
| 7,069,240 | B2 | 6/2006 | Spero et al. |
| 7,249,092 | B2 | 7/2007 | Dunn et al. |
| 7,305,129 | B2 | 12/2007 | Chellapilla et al. |
| 7,949,609 | B2 | 5/2011 | Colella |
| 8,135,624 | B1 | 3/2012 | Ramalingam et al. |
| 8,498,900 | B1 | 7/2013 | Spirin et al. |
| 8,583,496 | B2 * | 11/2013 | Yoo ..................... G06Q 20/108 705/17 |
| 8,645,222 | B1 | 2/2014 | Tamassia et al. |
| 8,769,556 | B2 | 7/2014 | Guo et al. |
| 8,924,259 | B2 | 12/2014 | Neighman et al. |
| 9,037,491 | B1 | 5/2015 | Lee |
| 9,292,852 | B2 | 3/2016 | Coulter et al. |
| 9,519,901 | B1 | 12/2016 | Dorogusker |
| 9,576,159 | B1 | 2/2017 | Templeton et al. |
| 9,622,074 | B2 | 4/2017 | Lee |
| 9,626,669 | B2 | 4/2017 | Lee |
| 9,721,123 | B1 | 8/2017 | Wade |
| 9,741,026 | B1 * | 8/2017 | Grassadonia ........ G06Q 20/385 |
| 9,754,255 | B1 | 9/2017 | Ma et al. |
| 9,760,883 | B1 | 9/2017 | Wade |
| 10,062,074 | B1 | 8/2018 | Zigoris |
| 10,147,076 | B2 | 12/2018 | Zhou et al. |
| 10,163,092 | B2 | 12/2018 | Barrett |
| 10,182,328 | B1 | 1/2019 | Maibach et al. |
| 10,242,357 | B1 | 3/2019 | Dorogusker et al. |
| 10,318,952 | B1 | 6/2019 | Wade et al. |
| 10,373,184 | B1 | 8/2019 | Kim et al. |
| 10,373,186 | B1 | 8/2019 | Kim et al. |
| 10,552,841 | B1 | 2/2020 | Dixit |
| 10,572,868 | B2 | 2/2020 | Barrett |
| 10,607,231 | B1 | 3/2020 | Cohn et al. |
| 10,740,748 | B2 | 8/2020 | Zigoris |
| 2002/0152180 | A1 | 10/2002 | Turgeon |
| 2003/0208386 | A1 | 11/2003 | Brondrup |
| 2003/0212609 | A1 | 11/2003 | Blair et al. |
| 2004/0029569 | A1 | 2/2004 | Khan et al. |
| 2004/0059924 | A1 | 3/2004 | Soto et al. |
| 2004/0143527 | A1 | 7/2004 | Benkert et al. |
| 2006/0047576 | A1 | 3/2006 | Aaltonen et al. |
| 2006/0206506 | A1 | 9/2006 | Fitzpatrick |
| 2006/0265602 | A1 | 11/2006 | Robinson |
| 2007/0069013 | A1 | 3/2007 | Seifert et al. |
| 2008/0040233 | A1 | 2/2008 | Wildman et al. |
| 2008/0041937 | A1 | 2/2008 | Vawter |
| 2008/0046366 | A1 | 2/2008 | Bemmel et al. |
| 2008/0126260 | A1 | 5/2008 | Cox et al. |
| 2008/0167961 | A1 | 7/2008 | Wentker et al. |
| 2008/0189214 | A1 | 8/2008 | Mueller et al. |
| 2008/0215475 | A1 | 9/2008 | Ramer et al. |
| 2008/0319869 | A1 * | 12/2008 | Carlson ................ G06Q 20/385 705/26.1 |
| 2009/0043696 | A1 | 2/2009 | Ornce et al. |
| 2009/0065571 | A1 | 3/2009 | Jain |
| 2009/0157547 | A1 | 6/2009 | Ruckart |
| 2009/0159663 | A1 | 6/2009 | Mullen et al. |
| 2009/0187466 | A1 | 7/2009 | Carter et al. |
| 2009/0187488 | A1 | 7/2009 | Shamilian |
| 2009/0187492 | A1 | 7/2009 | Hammad et al. |
| 2009/0228325 | A1 | 9/2009 | Simmons et al. |
| 2009/0307140 | A1 | 12/2009 | Mardikar |
| 2009/0313101 | A1 | 12/2009 | McKenna et al. |
| 2009/0327135 | A1 | 12/2009 | Nguyen et al. |
| 2010/0019033 | A1 | 1/2010 | Jolivet |
| 2010/0030651 | A1 | 2/2010 | Matotek et al. |
| 2010/0082445 | A1 | 4/2010 | Hodge et al. |
| 2010/0138344 | A1 | 6/2010 | Wong et al. |
| 2010/0169179 | A1 | 7/2010 | Ramer et al. |
| 2010/0191551 | A1 | 7/2010 | Drance et al. |
| 2010/0293065 | A1 | 11/2010 | Brody et al. |
| 2011/0184822 | A1 | 7/2011 | Matkovic |
| 2011/0307342 | A1 | 12/2011 | Haji |
| 2012/0010938 | A1 | 1/2012 | Standley et al. |
| 2012/0048922 | A1 | 3/2012 | Godager |
| 2012/0109818 | A1 | 5/2012 | Carlson et al. |
| 2012/0143707 | A1 | 6/2012 | Jain |
| 2012/0158580 | A1 | 6/2012 | Eram et al. |
| 2012/0197743 | A1 | 8/2012 | Grigg et al. |
| 2012/0253852 | A1 | 10/2012 | Pourfallah et al. |
| 2012/0290421 | A1 | 11/2012 | Qawami et al. |
| 2012/0331134 | A1 | 12/2012 | Lynn et al. |
| 2013/0132274 | A1 | 5/2013 | Henderson et al. |
| 2013/0173475 | A1 | 7/2013 | Lund |
| 2013/0198076 | A1 | 8/2013 | Zambelli Hosmer et al. |
| 2013/0218721 | A1 | 8/2013 | Borhan et al. |
| 2013/0232073 | A1 | 9/2013 | Sheets et al. |
| 2013/0267200 | A1 | 10/2013 | Weiner et al. |
| 2014/0058858 | A1 | 2/2014 | Stecewycz |
| 2014/0058862 | A1 | 2/2014 | Celkonas |
| 2014/0058865 | A1 | 2/2014 | Yang et al. |
| 2014/0188586 | A1 | 7/2014 | Carpenter et al. |
| 2014/0222596 | A1 | 8/2014 | S |
| 2015/0081556 | A1 | 3/2015 | Neighman et al. |
| 2015/0088750 | A1 | 3/2015 | Dua |
| 2015/0088755 | A1 | 3/2015 | Sobel et al. |
| 2015/0120557 | A1 | 4/2015 | Zhang |
| 2015/0154588 | A1 | 6/2015 | Purves et al. |
| 2015/0161597 | A1 | 6/2015 | Subramanian et al. |
| 2015/0317638 | A1 | 11/2015 | Donaldson |
| 2016/0005020 | A1 | 1/2016 | Fernando et al. |
| 2016/0048821 | A1 | 2/2016 | Sprecher |
| 2016/0125415 | A1 | 5/2016 | Mardikar et al. |
| 2016/0125416 | A1 | 5/2016 | Spencer et al. |
| 2016/0210626 | A1 | 7/2016 | Ortiz et al. |
| 2016/0217279 | A1 | 7/2016 | Scully-Power et al. |
| 2016/0314465 | A1 | 10/2016 | Martin |
| 2016/0364730 | A1 | 12/2016 | Rans et al. |
| 2017/0017958 | A1 | 1/2017 | Scott et al. |
| 2017/0046679 | A1 | 2/2017 | Gotlieb et al. |
| 2017/0161733 | A1 | 6/2017 | Koletsky et al. |
| 2017/0208464 | A1 * | 7/2017 | Guertler ............... H04B 10/112 |
| 2018/0082319 | A1 | 3/2018 | Wen et al. |
| 2018/0150846 | A1 | 5/2018 | Maheshwari et al. |
| 2019/0057377 | A1 | 2/2019 | Zigoris |
| 2019/0318355 | A1 | 10/2019 | Chopra et al. |
| 2019/0354981 | A1 | 11/2019 | Neighman et al. |
| 2020/0410500 | A1 | 12/2020 | Dorogusker |

FOREIGN PATENT DOCUMENTS

| | | |
|---|---|---|
| EP | 1 764 680 A2 | 3/2007 |
| JP | 2002-99858 A | 4/2002 |
| JP | 2003-150885 A | 5/2003 |
| JP | 2005-321873 A | 11/2005 |
| JP | 2009-86832 A | 4/2009 |
| JP | 2009-226689 A | 10/2009 |
| JP | 2011-197511 A | 10/2011 |
| JP | 2013-97657 A | 5/2013 |
| JP | 2013-238977 A | 11/2013 |
| JP | 2017-510903 A | 4/2017 |
| KR | 10-2011-0019887 A | 3/2011 |
| KR | 10-2012-0133706 A | 6/2012 |
| KR | 10-2012-0074497 A | 7/2012 |
| WO | 2011/156884 A1 | 12/2011 |
| WO | 2014/151582 A1 | 9/2014 |
| WO | 2015/100385 A1 | 7/2015 |

(56) References Cited

FOREIGN PATENT DOCUMENTS

OTHER PUBLICATIONS

Final Office Action dated Dec. 29, 2016, for U.S. Appl. No. 14/502,703, of Grassadonia, B., et al., filed Sep. 30, 2014.
Notice of Allowance dated Apr. 20, 2017, for U.S. Appl. No. 14/502,703, of Grassadonia, B., et al., filed Sep. 30, 2014.
"Card Reader," FullContact Developer API, last modified on Jun. 14, 2013, Retrieved from the Internet URL: https://web.archive.org/web/20130615043655/http://www.fullcontact.com/developer/docs/card-reader, on Sep. 29, 2015, pp. 1-8.
Friedman, T.D., "The Authorization Problem in Shared Files," IBM Systems Journal, vol. 9, Issue 4, Dec. 1970, pp. 258-280.
Goode, L., "Paying With Square's New Mobile-Payments App," All Things D, Apr. 30, 2012, Retrieved from the Internet URL: http://allthingsd.com/20120430/paying-with-squares-new-mobile-payments-app/, pp. 1-6.
Grove, V. J., "How Square's New Pay-With-Your-Name System Works," Mashable, May 23, 2011, Retrieved from the Internet URL: http://mashable.eom/2011/05/23/square-card-case/#_, on Sep. 10, 2014, pp. 1-17.
Grove, V. J., "Square Announces New Consumer Initiative: Pay with your name," Mashable, May 23, 2011, Retrieved from the Internet URL: http://mashable.com/2011/05/23/square-pay-with-name/, on Sep. 10, 2014, pp. 1-23.
Morrow, S. E., "Pay-by-name purchasing: changing the future of spending," Kmov.comSt.Louis, Dec. 29, 2011, Retrieved from the Internet URL: http://www.kmov.com/news/technology/Pay-by-name-purchasing-changing-the-future-of-spending-136411238.html, on Sep. 10, 2014, pp. 1-5.
Roland, M., "Software Card Emulation in NFC-enabled Mobile Phones: Great Advantage or Security Nightmare?," Fourth International Workshop on Security and Privacy in Spontaneous Interaction and Mobile Phone Use (IWSSI/SPMU), Newcastle, UK, Jun. 18, 2012, pp. 1-6.
Schneier, B., "Protocol Building Blocks," in Applied Cryptography—Second Edition—Protocols, Algorithms and Source Code in C, Chapter-2, pp. 37-38, Phil Sutherland, Katherine Schowalter (1996).
"Square—Pay-by-Name," Pay with your phone! Square Card case frees you of credit cards, Youtube.com, Retrieved from the Internet URL: https://www.youtube.com/watch?v=d3CYigOjx8o, Posted on Sep. 7, 2011, AppJudgment, pp. 1-15.
Non Final Office Action dated Feb. 26, 2014, for U.S. Appl. No. 13/831,103, of Neighman, D., et al., filed Mar. 14, 2013.
Non-Final Office Action dated Jul. 10, 2014, for U.S. Appl. No. 14/187,049, of Lee, R., filed Feb. 21, 2014.
Final Office Action dated Sep. 25, 2014, for U.S. Appl. No. 14/187,049, of Lee, R., filed Feb. 21, 2014.
Advisory Action dated Oct. 17, 2014, for U.S. Appl. No. 14/187,049, of Lee, R., filed Feb. 21, 2014.
Notice of Allowance dated Oct. 20, 2014, for U.S. Appl. No. 13/831,103, of Neighman, D., etal., filed Mar. 14, 2013.
Notice of Allowance dated Feb. 27, 2015, for U.S. Appl. No. 14/187,049, of Lee, R., filed Feb. 21, 2014.
Non-Final Office Action dated May 18, 2015, for U.S. Appl. No. 14/667,496, of Lee, R., filed Mar. 24, 2015.
Final Office Action dated Aug. 21, 2015, for U.S. Appl. No. 14/667,496, of Lee, R., filed Mar. 24, 2015.
Advisory Action dated Oct. 8, 2015, for U.S. Appl. No. 14/667,496, of Lee, R., filed Mar. 24, 2015.
Non-Final Office Action dated Feb. 5, 2016, for U.S. Appl. No. 14/667,496, of Lee, R., filed Mar. 24, 2015.
Non-Final Office Action dated Jun. 1, 2016, for U.S. Appl. No. 14/667,496, of Lee, R., filed Mar. 24, 2015.
Notice of Allowance dated Aug. 18, 2016, for U.S. Appl. No. 14/985,130, of Dorogusker, J., filed Dec. 30, 2015.
Examination Report No. 1 for Australian Patent Application No. 2014233712, dated Sep. 15, 2016.
Examination Report No. 1 for Australian Patent Application No. 2014369891, dated Nov. 3, 2016.
Examiner Requisiton for Canadian Patent Application No. 2,906,524, dated Nov. 4, 2016.
Notice of Allowance dated Dec. 9, 2016, for U.S. Appl. No. 14/667,496, of Lee, R., filed Mar. 24, 2015.
Notice of Acceptance for Australian Patent Application No. 2014369891, dated Feb. 21, 2017.
Non Final Office Action dated Mar. 9, 2017, for U.S. Appl. No. 15/339,744, of Dorogusker, J., filed Oct. 31, 2016.
Examiner Requisition for Canadian Patent Application No. 2,935,177, dated Apr. 7, 2017.
Non-Final Office Action dated Jul. 3, 2017, for U.S. Appl. No. 15/365,637, of Zigoris, P., filed Nov. 30, 2016.
Final Office Action dated Aug. 17, 2017, for U.S. Appl. No. 15/339,744, of Dorogusker, J., filed Oct. 31, 2016.
English translation of Notification of Reasons for Refusal for Japanese Patent Application No. 2016-561596, dated Oct. 13, 2017.
Advisory Action dated Oct. 31, 2017, for U.S. Appl. No. 15/339,744, of Dorogusker, J., filed Oct. 31, 2016.
Notice of Allowance for Canadian Patent Application No. 2906524, dated Nov. 16, 2017.
Final Office Action dated Jan. 4, 2018, for U.S. Appl. No. 15/365,637, of Zigoris, P., filed Nov. 30, 2016.
Non-Final Office Action dated Jan. 25, 2018, for U.S. Appl. No. 14/550,382, of Neighman, D., et al., filed Nov. 21, 2014.
Examiner Requisition for Canadian Patent Application No. 2,935,177, dated Feb. 28, 2018.
Advisory Action dated Apr. 9, 2018, for U.S. Appl. No. 15/365,637, of Zigoris, P., filed Nov. 30, 2016.
Notice of Allowance dataed Apr. 23, 2018, for U.S. Appl. No. 15/365,637, of Zigoris, P., filed Nov. 30, 2016.
Non Final Office Action dated Jun. 1, 2018, for U.S. Appl. No. 15/339,744, of Dorogusker, J., filed Oct. 31,2016.
Final Office Action dated Aug. 7, 2018, for U.S. Appl. No. 14/550,382, of Neighman, D., et al., filed Nov. 21, 2014.
Non-Final Office Action dated Aug. 13, 2018, for U.S. Appl. No. 14/984,931, of Dorogusker, J., filed Dec. 30, 2015.
Examination Report No. 1 for Australian Patent Application No. 2017228647, dated Sep. 28, 2018.
English translation of Notification of Reasons for Refusal for Japanese Patent Application No. 2016-561596, dated Oct. 5, 2018.
Advisory Action dated Nov. 15, 2018, for U.S. Appl. No. 14/550,382, of Neighman, D., et al., filed Nov. 21, 2014.
Final Office Action dated Dec. 14, 2018, for U.S. Appl. No. 14/984,931, of Dorogusker, J., filed Dec. 30, 2015.
Non Final Office Action dated Jan. 5, 2019, for U.S. Appl. No. 14/550,382, of Neighman, D., et al., filed Nov. 21, 2014.
International Search Report and Written Opinion in International Patent Application No. PCT/US2014/026038, dated Jul. 7, 2014.
International Search Report and Written Opinion for International Patent Application No. PCT/US2014/072285, dated Mar. 31, 2015.
Extended European Search Report for European Patent Application No. 14875157.1, dated Jul. 14, 2017.
English translation of Search Report for Japanese Patent Application No. 2016-561596, dated Sep. 7, 2017.
Final Office Action dated Sep. 9, 2019, for U.S. Appl. No. 14/984,931, of Dorogusker, J., filed Dec. 30, 2015.
Non-Final Office Action dated Oct. 21, 2019, for U.S. Appl. No. 16/111,026, of Zigoris, P., filed Aug. 23, 2018.
European Search Report dated Sep. 20, 2019, in European Patent Application No. 14 875 157.1, of Lee, R., filed Dec. 23, 2014.
First Examination Report for Australian Patent Application No. 2019240563, dated Nov. 22, 2019.
"Secure Code FAQs," BankSA, Retrieved from the Internet URL: http://web.archive.org/web/20121005105958/https://www.banksa.com.au/online-services/security-centre/we-protect-you/banksa-secure/secure-code-faqs, on Oct. 5, 2012, p. 1.
English-language translation of Decision to Grant a Patent for Japanese Patent Application No. 2016-561596, dated Jan. 18, 2019.
Notice of Allowance for Canadian Patent Application No. 2,935,177, dated Jan. 22, 2019.
Final Office Action dated Mar. 7, 2019, for U.S. Appl. No. 15/339,744, of Dorogusker, J., filed Oct. 31, 2016.

(56) References Cited

OTHER PUBLICATIONS

Second Examination Report for Australian Patent Application No. 2017228647, dated Mar. 12, 2019.
Advisory Action dated Mar. 21, 2019, for U.S. Appl. No. 14/984,931, of Dorogusker, J., filed Dec. 30, 2015.
Third Examination Report for Australian Patent Application No. 2017228647, dated Apr. 18, 2019.
Notice of Allowance dated Apr. 24, 2019, for U.S. Appl. No. 14/550,382, of Neighman, D., et al., filed Nov. 21, 2014.
Non-Final Office Action dated Jun. 3, 2019, for U.S. Appl. No. 14/984,931, of Dorogusker, J., filed Dec. 30, 2015.
Non-Final Office Action dated Jan. 8, 2020, for U.S. Appl. No. 15/339,744, of Dorogusker, J., filed Oct. 31, 2016.
Non-Final Office Action dated Jan. 16, 2020, for U.S. Appl. No. 14/984,931, of Dorogusker, J., filed Dec. 30, 2015.
Notice of Allowance dated Mar. 18, 2020, for U.S. Appl. No. 16/111,026, of Zigoris, P., filed Aug. 23, 2018.
Non-Final Office Action dated May 19, 2020, for U.S. Appl. No. 16/120,133, of Blackie, S., et al., filed Aug. 31, 2018.
Final Office Action dated Jul. 24, 2020, for U.S. Appl. No. 15/339,744, of Dorogusker, J., filed Oct. 31, 2016.
Final Office Action dated Aug. 21, 2020, for U.S. Appl. No. 15/675,099, of Grassadonia, B., et al., filed Aug. 11, 2017.
Advisory Action dated Oct. 9, 2020, for U.S. Appl. No. 15/339,744, of Dorogusker, J., filed Oct. 31, 2016.
Notice of Allowance dated Oct. 25, 2020, for U.S. Appl. No. 15/339,744, of Dorogusker, J., filed Oct. 31, 2016.
"Application programming interface—Wikipedia", XP055671378, Retrieved from the Internet URL: https://en.wikipedia.org/w/index.php?title=Application_programming_interface&oldid=587766714#API_and_protocols, on Jun. 26, 2020, pp. 1-8.
Non-Final Office Action dated Jul. 9, 2020, U.S. Appl. No. 16/120,095, of Blackie, S., et al., filed Aug. 31, 2018.
Summons to Attend Oral Proceedings for European Patent Application No. 14 875 157.1, dated Jun. 24, 2020.
Examination Report No. 2 for Australian Patent Application No. 2019240563, dated Jul. 13, 2020.

* cited by examiner

| Customer ID1 | Customer ID2 | Customer ID3 | Customer ID4 | First Name | Last Name |
|---|---|---|---|---|---|
| John@mail.com | 503-727-1000 | device1234 | john1234 | John | Doe |
| Jane@mail.com | 860-828-8001 | device2345 | jane1234 | Jane | Doe |
| Sally@mail.com | 203-764-2980 | device4321 | sally1234 | Sally | Smith |
| Jim@mail.com | 203-764-2980 | device5432 | james1234 | James | Cole |
| Jenn@mail.com | 901-379-0113 | device3456 | jenn1234 | Jennifer | Doe |

702

| Customer ID1 | Payment Card Number | Issuer | Expiration | Billing Address | Verification Status |
|---|---|---|---|---|---|
| John@mail.com | XXXX-XXXX-XXXX-XXXX | Bank of America | 1/31/2016 | 654 ABC st, New York, NY 10086 | Unverified |
| Jane@mail.com | XXXX-XXXX-XXXX-XXXX | Wells Fargo | 5/31/2017 | 100 PQ st, Seattle, WA 98101 | Verified |
| Sally@mail.com | XXXX-XXXX-XXXX-XXXX | Chase | 6/1/2015 | 30 Rock st, New York, NY 10012 | Verified |
| Jim@mail.com | XXXX-XXXX-XXXX-XXXX | PNC | 1/31/2013 | 100 ABC st, Palo Alto, CA 94022 | Unverified |
| Jenn@mail.com | XXXX-XXXX-XXXX-XXXX | Wells Fargo | 1/31/2016 | 123 Easy St., Carmel, CA 10086 | Verified |

704

| Customer ID2 | Payment Card Number | Issuer | Expiration | Billing Address | Verification Status |
|---|---|---|---|---|---|
| 503-727-1000 | XXXX-XXXX-XXXX-XXXX | Bank of America | 1/31/2016 | 654 ABC st, New York, NY 10086 | Unverified |
| 860-828-8001 | XXXX-XXXX-XXXX-XXXX | Wells Fargo | 5/31/2017 | 100 PQ st, Seattle, WA 98101 | Verified |
| 203-764-2980 | XXXX-XXXX-XXXX-XXXX | Chase | 6/1/2015 | 30 Rock st, New York, NY 10012 | Verified |
| 203-764-2980 | XXXX-XXXX-XXXX-XXXX | PNC | 1/31/2013 | 100 ABC st, Palo Alto, CA 94022 | Unverified |
| 901-379-0113 | XXXX-XXXX-XXXX-XXXX | Wells Fargo | 1/31/2016 | 123 Easy St., Carmel, CA 10086 | Verified |

PAYMENT BY USE OF IDENTIFIER

PRIORITY

This Application is a continuation of and claims priority to U.S. patent application Ser. No. 14/502,703, filed Sep. 30, 2014, which is incorporated in its entirety by reference herein.

BACKGROUND

When purchasing products or services, either at a physical location or online (e.g., via the Internet), a customer is typically given the option to pay by credit card, debit card, or other type of financial instrument (e.g., electronic payment account). Many online vendors and even some in-person vendors often require the customer to submit credentials and/or go through a complicated process. For example, to pay by credit card, the customer may be required to present the credit card and/or submit and verify the card number, expiration date, card verification value (CVV), billing address, etc. To pay using an electronic payment account can be equally complicated, as the customer must remember an account username and password and such username and password may be vulnerable to security risks. Accordingly, the conventional payment methods present many inconveniences. Although it has long been a goal to make payment methods simple and easy to execute, any solutions must balance the need for security simplicity.

BRIEF DESCRIPTION OF DRAWINGS

One or more embodiments of the disclosed technology are illustrated by way of example, and are not intended to be limited, in the figures of the accompanying drawings, in which like references indicate similar elements or components.

FIG. 7 are examples of database tables coupled to the transaction verification system of FIG. 6 for use in verifying and processing the transaction.

DETAILED DESCRIPTION

Figure 1:
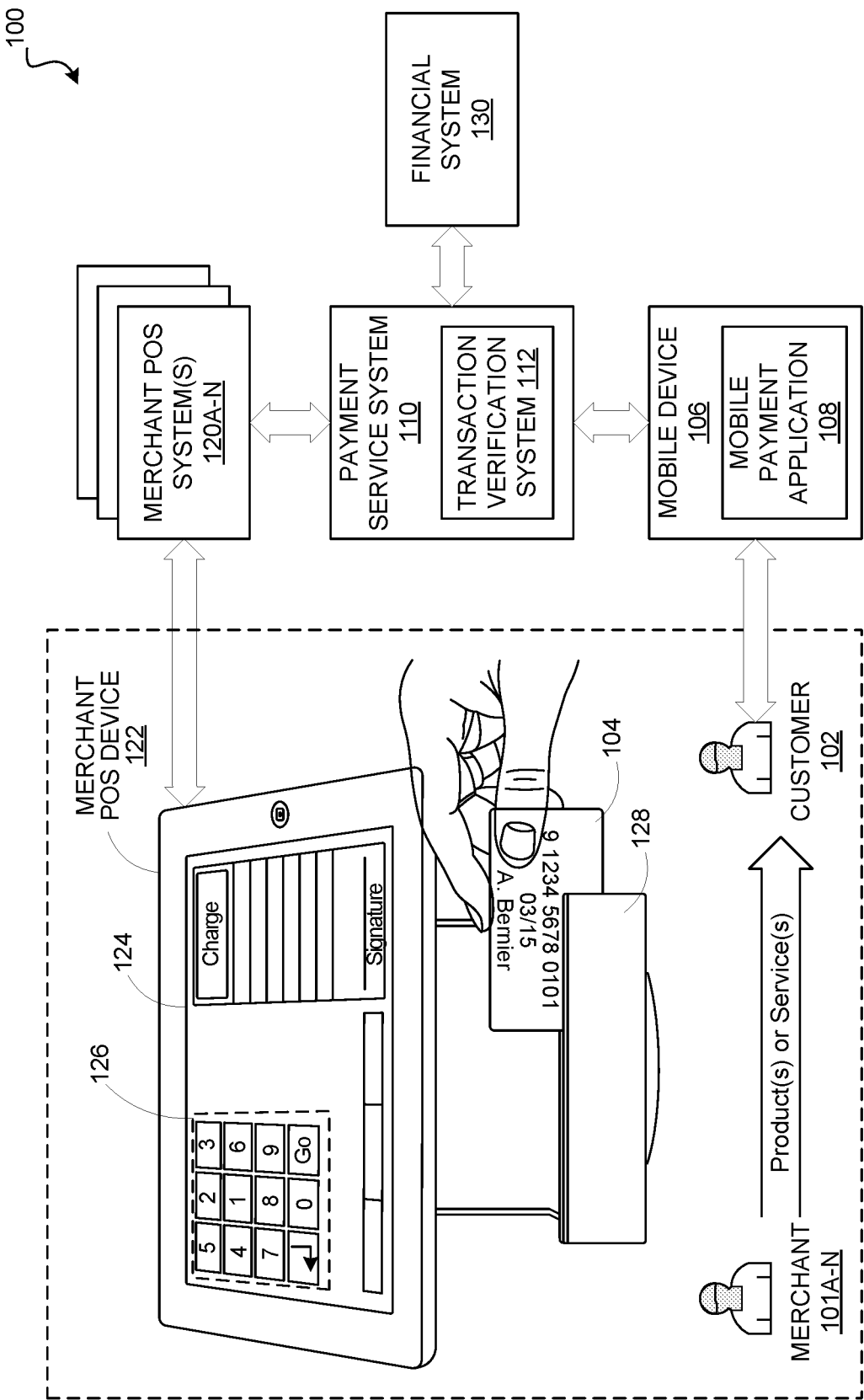
FIG. 1 is a flow diagram illustrating an example process for facilitating a financial transaction involving an identifier.

Technology is disclosed for processing a financial transaction by use of an identifier associated with a customer, particularly (though not exclusively) where the customer has used the identifier with a "payment card" at a point-of-sale terminal during a previous financial transaction ("the disclosed technology"). The term payment card as used herein refers to a payment mechanism that includes a conventional credit card, conventional a debit card, a conventional prepaid gift card, "smartcards" that have embedded integrated circuit chips, e.g., Europay-MasterCard-Visa (EMV) cards, a proxy card, or any financial instrument that functions as a combination of any of these mechanisms. The term "proxy card" as used herein refers to a card that bears a card number/account number that appears to be that of a real credit or debit card account (i.e., it is in the correct format), but where that card/account number is actually only a proxy for the customer's real card/account number. The term "sale", such as in "point-of-sale," refers to any type of payment-oriented transaction, including a lease or rental for example, and is not limited to an actual purchase.

Briefly described, the disclosed technology enables a customer, who uses a payment card to pay for product(s) or service(s) and further provides an identifier in the same transaction, to use the identifier as a payment mechanism in future transactions (with the same or different merchant). In some embodiments, the disclosed technology involves communication between a customer's user device, a payment service system (hereinafter, "PSS"), and one or more merchant POS systems associated with the PSS. The merchant POS systems collect a variety of information related to transactions conducted between the merchant POS systems and the customer, and forward this information to the PSS. This information can include identification information, such as an identifier that identifies the customer. The identifier can be a creation of the customer (i.e., user-generated identifier) having one or more alphanumeric characters (e.g., "sf49ers"), contact information of the customer (e.g., an email address or a telephone number), a device identifier identifying a computing device of the customer, etc. The PSS stores the identifying information, or identifier, in association with one or more payment cards of the customer used in the transactions. Once the identifier is stored, the customer can utilize the identifier as a payment mechanism to conduct future transactions with one or more merchant POS systems associated with the PSS. When the identifier is used in a transaction, the PSS initiates processing of payment for the transaction based on the identifier, without requiring any financial instrument from the customer. In some embodiments, the PSS sends a transaction verification request independently to the customer based on the identifier (e.g., a text message), and processes the transaction only upon confirmation by the customer.

Among other benefits, the disclosed technology enables the customer to use the identifier to pay for a purchase without having to provide a payment card. Further, since, in some instances, a transaction is only approved for processing upon confirmation by the customer, the customer is provided an additional security layer, as an attacker would not have access to the medium to which the transaction verification request is sent (e.g., email account or smartphone assigned to the phone number). Additionally, the identifier can be stored in association with information collected over time through numerous transactions conducted by the customer with different merchants, thereby enabling the PSS to auto-populate information (e.g., billing address, shipping address, name, etc.) on behalf of the customer in processing the customer's transactions.

Consider the following example scenario in which the disclosed technology can be implemented. The PSS is a computer system employed by a payment service to render a variety of payment services to merchants and their customers. As an example, merchants A and B each employs the service of the PSS to process payment transactions of the respective merchants, including, for example, executing or triggering the process to transfer money from a customer's financial account to the respective merchant's financial account. A customer purchases an item from merchant A and initiates a payment transaction by swiping a payment card at the merchant's physical POS device. Merchant A's physical POS system collects the transaction data (e.g., payment card information read from the card, payment amount, etc.) and forwards it to the PSS to request payment authorization. Upon obtaining payment authorization (e.g., from an acquire, card payment network, and/or issuer), the PSS approves the transaction and notifies the physical merchant POS system.

In some embodiments, the PSS also provides the physical merchant POS system an option to generate an electronic receipt for the customer. For example, the PSS prompts merchant A with a message whether the merchant desires to generate an electronic receipt. Either upon receiving the prompt or before the prompt, merchant A asks the customer whether she wishes to receive the electronic receipt, and if so, to provide a contact method in order to receive the receipt. The customer submits, using an interface of the physical POS system, a telephone number, for example, to receive the receipt (e.g., by the messaging method in the form of a text message). The physical POS system forwards the telephone number to the PSS. In response, the PSS generates and delivers the receipt to the customer using the transaction data and the telephone number received from the physical POS system. Furthermore, the PSS sends a confirmation message prompting the customer to verify the telephone number. Note that the confirmation message can be sent along with the receipt or separate from the receipt, e.g., either before sending the receipt (to ensure the right individual receives the receipt) or after sending the receipt.

Upon receiving a confirmation text message back from the customer, the PSS stores the telephone number as an identifier associated with the customer, as the PSS confirmation text message has verified that the telephone number belongs to the customer. In particular, the PSS stores the identifier in association with the payment card information of the payment card used in the transaction with merchant A.

In a second transaction with merchant B, the customer provides the telephone number to pay for a service rendered by merchant B. Merchant B can be located at either a physical location or online. That is, the customer can provide the identifier at a physical POS system of merchant B or at a website hosted by a POS system of merchant B. Note that Merchant B can even be the same Merchant A in some embodiments, where the customer, having completed a previous transaction, can now complete a second transaction by merely providing the identifier.

Upon receiving the identifier, the merchant POS system of merchant B transmits a payment request to the PSS, where the payment request includes the identifier and the transaction data related to the second transaction. In order to process the payment request, the PSS accesses one or more databases to find a matching identifier and to identify payment card information associated with the identifier. Because the identifier has been previously stored in the transaction with merchant A, the PSS is able to find a match, and in response, sends a transaction verification request message to the customer. For example, as the identifier is a telephone number, the PSS sends a text message prompting the customer to confirm the payment to merchant B.

Additionally, because the identifier has been stored in association with the payment card information, the PSS is able to locate the payment card of the customer. As such, once the PSS receives the customer's confirmation to the transaction verification request message, the PSS initiates a payment authorization process using the identified payment card. In particular, the PSS causes a transfer of the payment amount from the financial account associated with the identified payment card to a financial account associated with the merchant. The term "cause" and variations thereof, as used in the preceding paragraph and elsewhere in this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

In some embodiments, the customer is prompted to provide contact information along with the identifier, e.g., where the identifier is not already contact information. For example, the customer first submits an identifier "sally1234," either directly to the PSS or indirectly through a merchant POS system associated with the PSS. In such an example, the customer next submits contact information, as the PSS may require the customer to provide some contact information in order to perform the transaction verification operation discussed above. In some embodiments, the contact information can be collected in an indirect or passive way, e.g., the customer submits a telephone number or an email address to receive an electronic receipt. In some embodiments, the contact information can be collected in a direct way, e.g., the customer completes a registration process with the PSS and/or through a merchant POS system associated with the PSS. Upon receiving the contact information, the PSS stores the identifier in association with the contact information, along with the payment card information.

Although the example provided above uses a telephone number as an identifier according to the embodiment described above, in other embodiments, an identifier other than the telephone number may be used. The identifier can be any identification information that identifies the customer including, for example, an email address, a driver's license number, a social security number, an employee identification number (ID), a device identifier (ID), a mobile application identifier (ID), an IP address, a personal identification number (PIN), a card verification value (CVV), a security access code, a messaging handler (e.g., instant message username, social networking username, etc.), or any other identification means.

The identifier can also be a biometric identifier (e.g., fingerprint, voice, face, iris, retina, heartbeat, etc.). For example, a customer looks into a camera installed at a POS device, where the camera captures a photograph of the customer's face/facial expression. The customer's photograph is then stored in association with the customer's credit card by the PSS. At a next transaction, the customer can simply have his face scanned in order to pay for the transaction. In another example, the customer provides his voice (e.g., pronounces his name and payment to be recorded) in addition to a debit card to pay for a transaction. In a next transaction at another (or same) POS system associated with the PSS, the customer can simply speak his name, along with a payment amount, in order to pay for the transaction, without provision of the debit card (or any other financial instrument).

Further, the payment card used in the example above is a specific type of a financial instrument. Other types of financial instruments, other than the payment card, can be used to initiate a financial transaction. An example of another type of a financial instrument is a biometrically identifiable instrument, such as a person's finger (e.g., for fingerprint recognition), face, iris or retina, heartbeat, etc. Alternatively, a financial instrument can be a software instrument or virtual instrument, such as a virtual wallet.

References in this description to "an embodiment", "one embodiment" or the like, mean that the particular feature, function, structure or characteristic being described is included in at least one embodiment of the disclosed technology. Occurrences of such phrases in this specification do not necessarily all refer to the same embodiment. On the other hand, the embodiments referred to also are not necessarily mutually exclusive.

FIG. 1 is a flow diagram illustrating an example process 100 for facilitating a financial transaction involving an identifier. As illustrated in the embodiment of FIG. 1, the process 100 includes at least two transactions: transaction 1 involving a merchant POS device 122A belonging to a merchant 101A (also referred to as "payee 101A") and a mobile device 106 belonging to a customer 102 (also referred to as "payer" or "consumer"); and transaction 2 involving a merchant POS device 122B belonging to a merchant 101B (also referred to as "payee 101B") and the mobile device 106. The process 100 further includes a payment service system 110 ("PSS 110"), a financial system 130, and one or more merchant POS systems 120A-N associated with the one or more merchant POS devices 122A-N, where A is an integer of 1 and N is an integer greater than 1. Other configurations are also possible in other embodiments.

Each of the merchant POS systems 120A-N includes a respective POS device 122, which can be a general purpose device with data processing capabilities. For example, the POS device 122 can be a mobile phone, a tablet, an e-reader, other mobile or portable computing devices such as, for example, smart watches or glasses, or other stationary computing devices such as, for example, electronic cash registers. The POS device 122 presents an interface 126 on an output device. In the illustrated embodiment, the output device is a touch screen 124, although alternative configurations are possible.

The mobile device 106 can be any mobile computing device, for example, a smart phone, tablet computer, notebook computer, and the like. A mobile payment application 108 runs on the mobile device 106. The PSS 110 can be a computer system in communication with the mobile device 106 and the merchant POS system(s) 120, such as over a network. The PSS 110 may be one or more computing devices. For example, the PSS 110 may be a server computer, a network of computing systems, a cloud computing environment, a virtualized computing environment, or any combination thereof. Communications between the mobile device 106 and the PSS 110 may be any form of data communications, including mobile telecommunication (e.g., cellular), WiFi, wireless Ethernet, wired Ethernet, or any other form of Internet connection.

The PSS 110 facilitates Transaction 1 and Transaction 2 in the process 100. Transaction 1 begins when the merchant 101A swipes a payment card 104 through a card reader 128 of the merchant POS device 122A. The term "swipe" here refers to any manner of triggering a physical card reader to read a physical card, such as passing a card through a magnetic stripe card reader, optical scanner, or smartcard reader, radio frequency identification (RFID) reader, or the like. The payment card is provided to the merchant 101A by the customer 102 to initiate a payment transaction for product(s) or service(s) tendered by the merchant 102A (e.g., a coffee or a haircut). The merchant POS device 122A reads the payment card information from the payment card (e.g., the cardholder's name, payment card number, expiration date, card verification value (CVV), billing address, etc.) and sends it to the PSS 110.

The PSS 110, in turn, processes the transaction by routing an authorization request to a computer system of an acquirer, where the authorization request includes data about the transaction ("transaction data"). The transaction data can include, for example, the aforementioned payment card information as well as the amount of the transaction, current date and time, data identifying the merchant and the merchant's merchant category code (MCC). The acquirer, upon receiving the transaction data, sends the data to a computer system of a card payment network (e.g., Visa, MasterCard, etc.), which forwards the data to a computer system of an issuer for authorization. If the transaction is approved or authorized by the issuer, a payment authorization message is sent from the issuer to the PSS 110 via a path opposite of that described above. The PSS 110, in turn, sends a notification of the payment authorization to the merchant POS system 120A. Once the transaction is authorized, settlement and clearing occurs. For example, the PSS 110 executes or triggers the settlement and clearing. During settlement and clearing, the issuer sends the funds associated with the authorized transaction through the card payment network to the acquirer to be deposited in a financial account associated with the merchant 101A. The acquirer, the card payment network, and the issuer can be a part of the financial system 130.

In some embodiments, the PSS 110, in addition to executing or triggering the transfer of the funds, sends a transaction approval message for transmission to the merchant POS system 120A. In such embodiments, the transaction approval message can include a service message configured to solicit additional information from the customer 102. For example, the transaction approval message prompts the merchant 101A via the merchant POS device 122A associated with the merchant POS system 120A to decide whether the merchant desires for additional service related to the transaction. The additional service can be generation of an electronic receipt for the customer 102. If the merchant 102A (and/or the customer 102) desires the receipt, the PSS 110 causes the merchant POS system 120A to prompt the customer to provide contact information, such as an email address or a telephone number, that can be used to receive the receipt for Transaction 1. The merchant POS system 120A communicates with the merchant POS device 122A to display the prompt requesting the contact information from the customer 102, who submits the requested information via a user interface of the merchant POS device 122A. The merchant POS device 122A forwards the submitted information to the merchant POS system 120A.

After receiving the contact information, the merchant POS system 120A sends a message that includes the contact information to the PSS 110. The PSS 110 generates and sends an electronic receipt to the customer 102 using the contact information (e.g., a text message receipt). Furthermore, the PSS 110 stores the contact information as an identifier of the customer 102 for use in future transactions. In storing the identifier, the PSS 110 associates the identifier with the payment card information of the payment card used in Transaction 1. The PSS 110 further creates an account with the PSS 110 on behalf of the customer 102 by using this newly created identifier. Accordingly, the customer 102 is able to initiate a future transaction by merely providing the identifier, without being required to go through any complicated registration process to obtain the account with the PSS 110 in the first place. That is, an association between the payment card and the customer 102 gets created, or established, on behalf of the customer, such that any other merchant, who receives the identifier, is able to obtain the payment card information of the customer 102, thereby enabling a smooth transaction experience.

In some embodiments, the PSS 110 causes the merchant POS system 120A to prompt the customer to provide a user-created identifier (i.e., another identifier) in addition to, or in lieu of, the contact information. For example, the merchant POS system 120A causes the merchant POS device 122A to display a prompt asking the customer 102 whether she wishes to submit a user-created identifier that can be used in future transactions. If the customer 102 submits, for example, the user-created identifier in addition to the contact information (e.g., to receive the receipt), the merchant POS system 120A forwards both the user-created identifier and the contact information to the PSS 110, which stores the user-created identifier in association with the contact information and the payment card information. If the customer 102 submits, for example, only the user-created identifier (e.g., to conduct future transactions using the identifier), the merchant POS system 120A forwards the identifier to the PSS 110, which stores the identifier in association with the payment card information.

In some embodiments, prior to storing the identifier, the PSS 110 performs a verification operation to confirm with the customer 102 that the identifier actually belongs to the customer 102. The PSS 110 can include a transaction verification system 112 configured to perform such verification operation. The verification operation provides an additional security to the future payment transaction. That is, the PSS 110, along with the customer 102, can be assured that in the future payment transaction, the identifier is authentic and can serve as a payment mechanism of the customer 102.

In some embodiments, the PSS 110 performs the identifier verification operation by sending a message that can be displayed on a computing device of the customer 102, such as the mobile device 106. For example, the PSS 110 sends an email message using the email address submitted by the customer 102 to serve as the identifier. Note that in such example, the email address can also be the contact information submitted by the customer 102, without any knowledge that such contact information is automatically used as an identifier of the customer by the PSS 110.

In some embodiments, the PSS 110 performs the identifier verification operation by prompting the customer to submit contact information, in addition to a user-created identifier. In such embodiments, the PSS 110 sends a message to the customer using the contact information to verify the user-created identifier (e.g., Hi, please confirm you have signed up for "SF49ers" as your identifier for future payments.). The message can be displayed on a computing device of the customer 102, such as the mobile device 106, where the message can be, for example, an email address, a text message, or a printed message (e.g., via postal mail). The contact information is then stored in association with the user-created identifier. In some embodiments, the PSS 110 performs the identifier verification operation by simply prompting the customer to confirm via a user interface at a POS system. For example, after the customer submits the user-created identifier, the user interface of the POS system displays the submitted user-created identifier and prompts the customer to review and confirm. Further details regarding the identifier verification operation are discussed in reference to FIG. 2.

Transaction 2 begins when the customer 102 visits a second merchant, e.g., a merchant 101B, and provides the identifier at the merchant POS device 122B associated with the merchant POS system 122B. The customer 102 provides the identifier to initiate a payment transaction, e.g., for product(s) or service(s) rendered by the merchant 122B. The merchant POS device 122B, communicates the received identifier along with the transaction data related to Transaction 2 to the merchant POS system 122B. The merchant POS system 122B sends a payment request to the PSS 110, where the payment request includes the transaction data and the identifier.

The transaction verification system 112 of the PSS 110 processes the payment request, e.g., by parsing the information included in the request to identify the identifier. The transaction verification system 112 uses the identifier to identify a payment card associated with the identifier based on a previously stored association (e.g., an association stored in Transaction 1). In particular, the transaction verification system 112 accesses one or more databases to locate a matching identifier and payment card information (and/or payment card) that is associated with the identifier. Further, the transaction verification system 112 sends a transaction verification message to the customer 102 by using the identifier. For example, the identifier is an email address associated with the customer 102 and the transaction verification message is sent as an email message from an email associated with the PSS 110 to the email address. In some embodiments, where the identifier does not provide contact information of the customer 102, the transaction verification system 112 accesses the one or more databases to identify the contact information stored in association with the identifier. The transaction verification system 112 then sends the transaction verification message to the customer 102 by using the identified contact information.

The customer 102 can receive the transaction verification message in the form of an email address, a text message, or a push notification. The push notification can be viewed through the mobile payment application 108 that is associated with the PSS 110. The push notification can be presented with a "Swipe to confirm" sliding bar configured to receive a confirmation input from the customer 102 to verify the payment request. In response to a confirmation from the customer 102, the PSS 110 proceeds to approve the payment transaction and executes or initiates a process to transfer the payment to a financial account associated with the merchant POS system 120B (e.g., directly or through one or more financial institution entities as discussed above). Further details regarding the transaction verification operation will be discussed in reference to FIG. 3.

Figure 2:
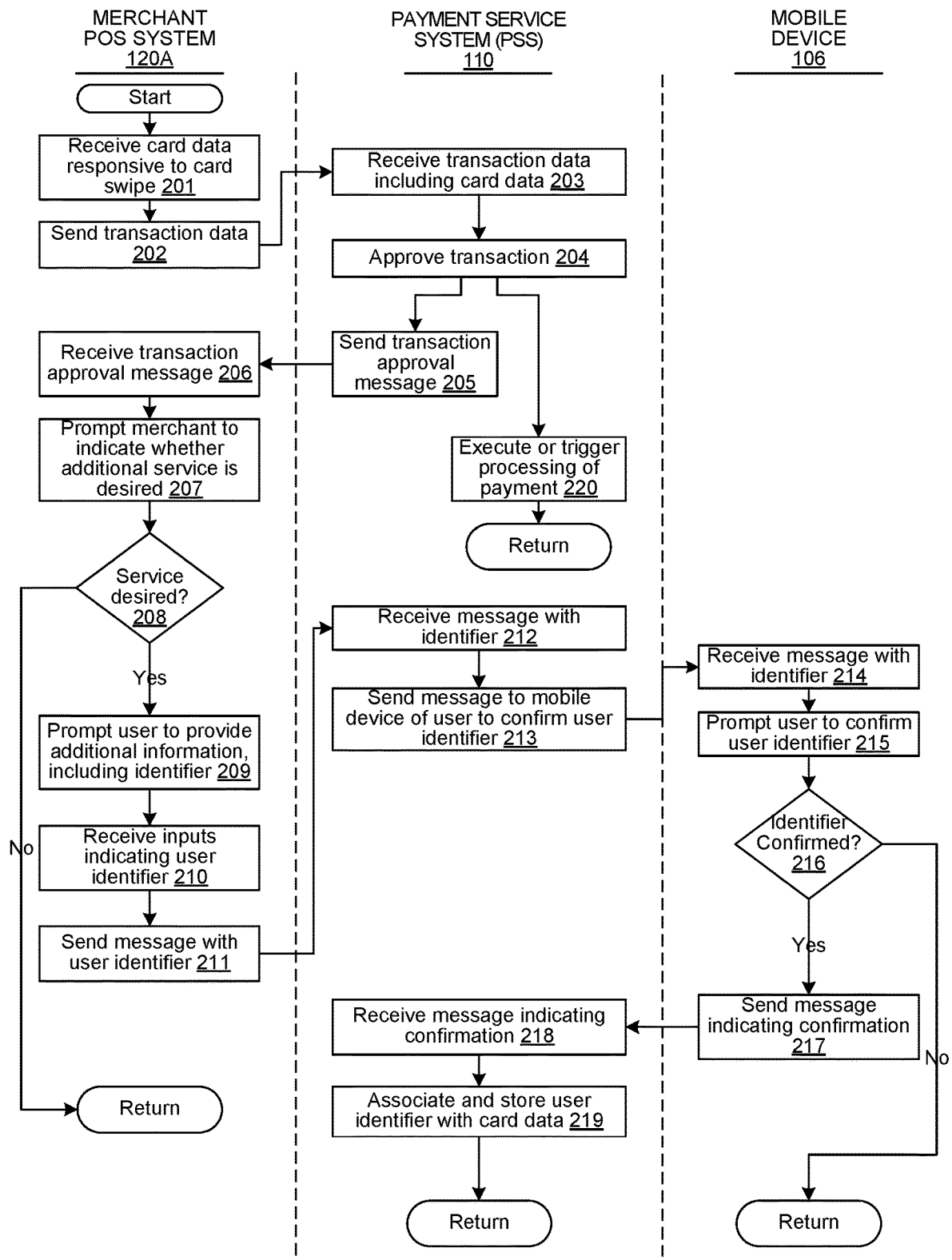
FIG. 2 is a flow diagram illustrating an example process of receiving an identifier in connection with use of a payment card.

FIG. 2 is a flow diagram illustrating an example process 200 of receiving an identifier in connection with use of a payment card. For purposes of illustration only, the process 200 is explained with reference to some elements illustrated in FIG. 1. The process 200 begins at block 201, in which a merchant POS system 120A initiates a payment transaction by reading card data from the consumer's payment card 104 in response to a card swipe through the card reader 128. The payment card 104 can be an actual credit, debit, or pre-paid card of the consumer, for example, or it can instead be a proxy card such as described above, e.g., a card issued by the PSS 110 and associated with one or more financial accounts of the consumer. The card data can include, for example, the consumer's name, card number, card expiration date, and card verification value (CVV).

At block 202, in response to the card swipe, the merchant POS system 120A transmits onto a network a transaction approval request that includes data about the transaction ("transaction data"), for transmission to the PSS 110. The transaction data can include, for example, the aforementioned card data as well as the amount of the transaction, current date and time, data identifying the merchant and the merchant's merchant category code (MCC). The transaction approval request may be transmitted directly to the PSS 110, or it may get routed to the PSS 110 through one or more intermediary entities, such as an acquirer and/or a card payment network, etc. In some embodiments, the card number on the consumer's payment card is sufficient to enable routing entities to determine that the transaction approval request should be routed to the PSS 110, such as in the case where the payment card is a proxy card issued by the PSS 110.

At block 203, upon receiving the transaction approval request, the PSS 110 executes a transaction authorization process using the transaction data. As discussed above, the transaction authorization process can be executed by the PSS 110 directly or through one or more intermediary entities. For example, the PSS 110 processes the payment for the transaction with the merchant POS system 120A by sending an authorization request to the issuer of the payment card via the acquirer and the card payment network. Upon receiving successful transaction authorization, the PSS 110 approves the transaction at block 204. For the sake of simplicity, the scenario in which the transaction is denied is not discussed here, since it is not germane to the technique being introduced here. In response to the transaction being approved, the PSS 110 performs at least two operations. At block 220, the PSS 110 executes or triggers a process to transfer a payment from a financial account associated with the customer to a financial account associated with the merchant POS system 120A. At block 205, the PSS 110 sends onto the network a transaction approval message for transmission to the merchant POS system 120A.

At block 206, the merchant POS system 120A receives the transaction approval message sent by the PSS 110 in block 205. In the transaction approval message, the PSS 110 includes a service message configured to prompt the merchant of the merchant POS system 120A whether the merchant desires for additional service related to the transaction (i.e., block 207). The additional service can include, for example, generation of a receipt for the transaction. In another example, the additional service can include delivery and/or shipment (e.g., in a transaction for purchase of furniture). If the merchant does not desire any additional service performed by the PSS 110, the process 200 ends.

At block 208, the merchant POS system 120A receives the an input from the merchant and/or the customer in response to the prompt at block 207. Note that the merchant and/or the customer can provide this input at any time convenient for the merchant and/or the customer, which may be while the customer is still present at the merchant or at a later time.

If the merchant desires an additional service performed by the PSS 110, the process 200 proceeds to block 209. At block 209, the PSS 110 causes the merchant POS system 120A to prompt the user to provide additional information associated with the desired service (e.g., an application installed on the merchant POS system 120A prompts the merchant to ask the customer for one or more pieces of information). In one example, the customer informs the merchant that she wants an electronic receipt of the transaction. In such example, the merchant submits an input that requests for receipt generation to the application, and in response, the application causes the merchant POS system 120A to display a prompt for the customer to submit her contact information, such as an email address or a telephone number, to receive the electronic receipt. Alternatively, the merchant can submit the customer's contact information into the user interface of the merchant POS system 120A.

In another example, the transaction is for the purchase of furniture that requires delivery. In such example, the merchant POS system 120A displays on a user interface a prompt for the customer to submit her contact information, such as a delivery address, to receive the purchased furniture. Alternatively, the merchant can submit the customer's contact information into the user interface of the merchant POS system 120A.

In yet another example, the additional service is a payment service that allows the customer to pay for items in future transactions with any other merchant (including the merchant 120A and/or a different merchant) by use of an identifier associated with the customer ("user identifier"). In such example, the merchant POS system 120A displays on a user interface a prompt for the customer to submit the user identifier, such as a telephone number, an email address, or a user-generated identifier that includes one or more alphanumerical characters (e.g., "user1234").

In some embodiments, the contact information submitted by the customer is stored automatically as the user identifier. As discussed above, such user identifier can be used by the customer in a future transaction to make a purchase, in lieu of providing a payment card. In some embodiments, the merchant can prompt the customer to submit the user identifier (separate from the contact information), where the user identifier is stored in association with the contact information, and is used by the customer in a future transaction to make a purchase. In such embodiments, the customer can choose to submit one or more characters that make up the identifier, and can submit the contact information at the same time, or at another time (e.g., subsequently). In some embodiments, the contact information may have already been submitted at another transaction. In such embodiments, the customer may decide subsequently to create a user-generated identifier to be associated with the already submitted contact information.

In some embodiments, the user identifier can be a biometric identifier, such as the customer's voice, face, fingerprint, heartbeat, iris, etc. In such embodiments, the POS system 120A includes a mechanism that allows the customer to submit the biometric inputs (e.g., voice recorder, camera, iris scanner, fingerprint scanner, etc.) In some embodiments, the mechanism can be embedded or integrated on a computing device of the customer (e.g., mobile device 106). The mechanism can be a software application installed on the customer's computing device, which is equipped with a hardware mechanism (e.g., fingerprint scanner) to receive the customer's biometric input(s). The software application can be a mobile application associated with the PSS (e.g., an app that receives instructions from the PSS 110), the POS system 120A (e.g., an app that receives instructions from the POS system 120A and/or that executes instructions on behalf of the POS system 120), or another third-party service associated with the PSS and/or the POS system 120A (e.g., in communication with the PSS and/or the POS system 120A via wired or wireless network).

At block 210, the merchant POS system 120A receives inputs corresponding to the desired service(s), where the inputs include a user identifier, according to one embodiment. At block 211, the merchant POS system 120A sends a message that includes the user identifier, for transmission to the PSS 110. At block 212, the PSS 110 receives the message with the user identifier, and in response sends a confirmation message to the customer based on the identifier (i.e., block 213), for transmission to the mobile device 106.

For example, the PSS 110 receives a telephone number as the identifier, and sends a text message using the telephone number to the customer, where the text message can be displayed on a smartphone of the customer. In another example, the PSS 110 receives a telephone number as the customer's contact information, in addition to a user identifier (e.g., sally1234). Upon receiving the identifier, the PSS 110 sends a text message to the customer using the telephone number, where the text message displays the identifier and prompts the customer to confirm that the identifier belongs to her. Note that in such confirmation, the customer can verify both her telephone number in addition to her user-generated identifier. In yet another example, the PSS 110 receives an email address as the customer's contact information, in addition to a user identifier (e.g., telephone number). In response to receiving the email address and the telephone number, the PSS 110 sends an email message to the customer using the email address, where the email message displays the telephone number and prompts the customer to confirm that the telephone number belongs to her. Note that in such confirmation, the customer can verify both her email address and her telephone number.

Figure 4A:
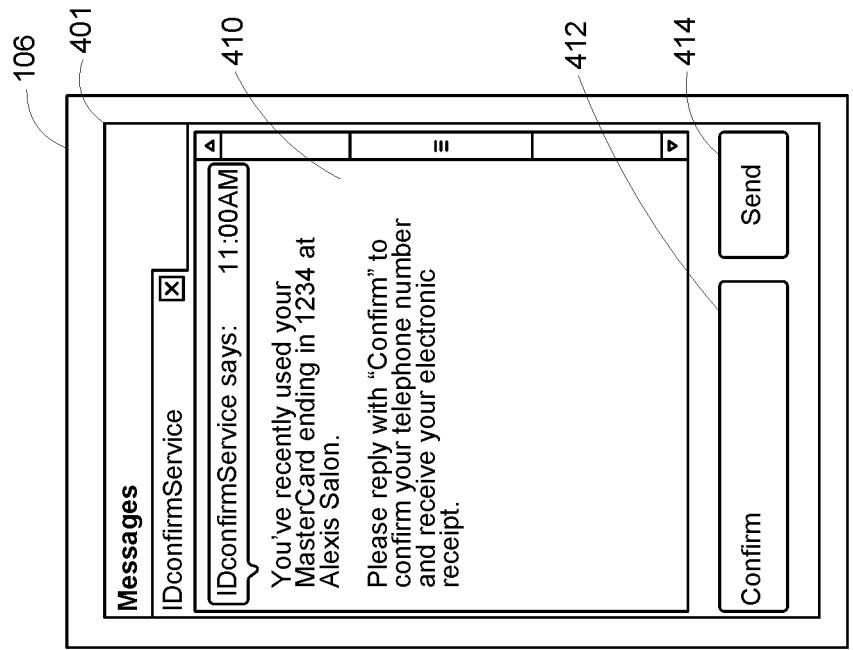
FIGS. 4A-4B are user interface diagrams illustrating examples of identifier confirmation messages that can be generated by a user's computing device to enable identifier verification.
Figure 4B:
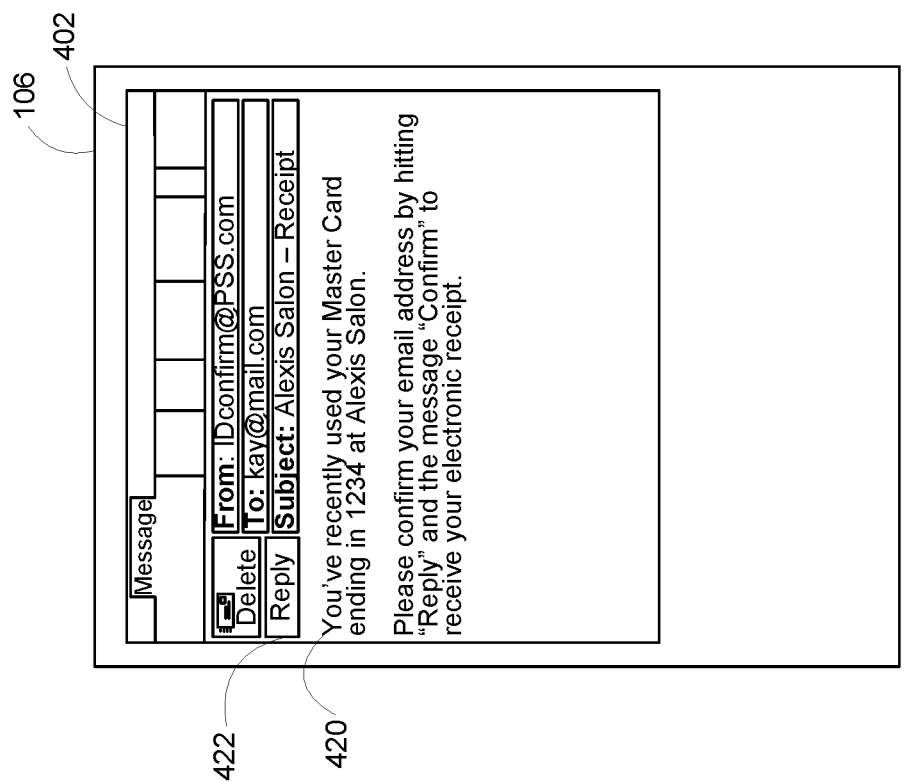

At block 214, the mobile device 106 of the customer receives the confirmation message sent by the PSS 110 by various methods that depend on the contact information and/or the user identifier. Within the mobile device 106, the confirmation message is conveyed up through the various lower protocol layers to a mobile messaging application (hereinafter simply "messaging application") that is configured to recognize the confirmation message, in accordance with one of the various methods used by the PSS 110. The messaging application can include, for example, an email application, a text message application, a social networking application, a microblogging application, an instant messaging application, or any other application capable of receiving such message. In response to recognizing this message, at block 215 the messaging application causes the mobile device 106 to display the confirmation message to the customer and to prompt the customer to indicate whether the customer wishes to confirm the identifier (or cancel/end the process). For example, the messaging application displays a text message sent by the PSS 110. In another example, the messaging application displays an email message. Examples of what such a display may look like are illustrated in FIGS. 4A-4B.

At decision block 216, the messaging application receives the customer's input in response to the prompt at block 215. If the customer's input indicates the customer does not confirm (e.g., customer sends a reply text message "Cancel"), the process 200 ends. If the input indicates the customer has confirmed (e.g., customer sends a reply text message "Cancel"), the process 200 proceeds to block 217.

At block 217, the messaging application causes the mobile device 106 to send a message indicating confirmation by the customer, for transmission to the PSS 110 via the wireless network. At block 218, the PSS 110 receives the message from the mobile device 106 indicating that the identifier is now verified based on the confirmation from the customer. At block 219, the PSS 110 associates and stores the verified identifier with the card data received at block 201. In some embodiments, the PSS 110 also associates and stores the identifier with any contact information received at block 210. In such embodiments, the identifier is associated with both the card data and the contact information. In a future transaction, such as one conducted with a merchant POS system 120B as described in reference to FIG. 3, the customer can use the identifier to pay for the transaction without having to provide the payment card again (and/or any other payment card).

Figure 3:
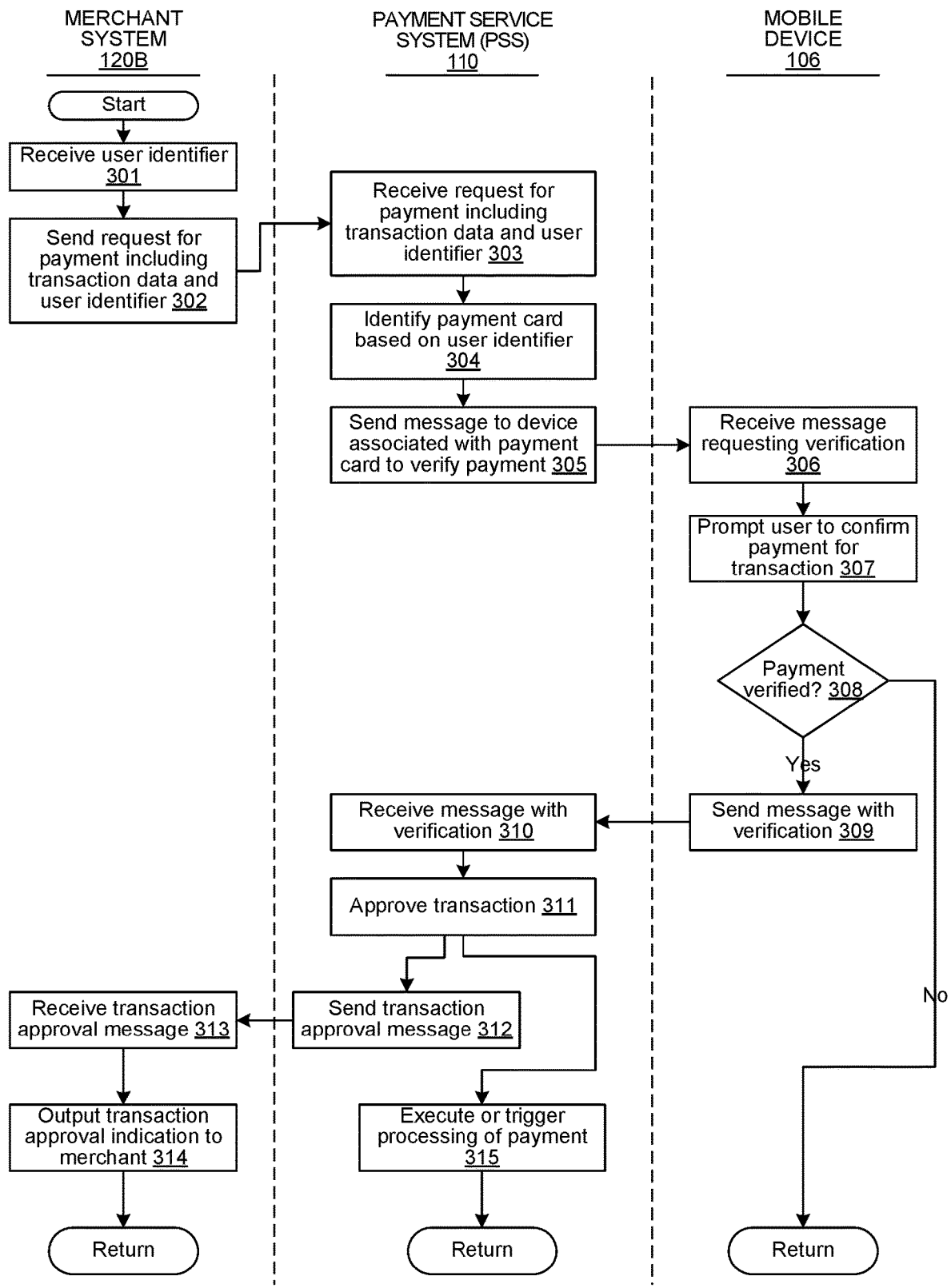
FIG. 3 is a flow diagram illustrating an example process of processing and verifying a transaction in connection with use of an identifier.

FIG. 3 is a flow diagram illustrating an example process 300 of processing and verifying a transaction in connection with the use of an identifier. For purposes of illustration only, the process 300 is explained with reference to some elements illustrated in FIG. 1. The process 300 begins at block 301 when a merchant POS system 120B receives a user identifier from a customer to initiate a payment transaction. The user identifier can be the identifier stored in association with card data (or the card itself) and/or contact information associated with the customer at block 219 of the process 200, in accordance with some embodiments.

In some embodiments, the merchant POS system 120B receives the identifier when a merchant inputs the identifier, provided by the user, into a user interface of the merchant POS system 120B. In some embodiments, the merchant POS system 120B can receive the identifier when the customer herself inputs the identifier into the user interface of the merchant POS system 120B. In some embodiments, the identifier can be a biometric identifier, such as the customer's voice, face, fingerprint, heartbeat, iris, etc. In such embodiments, the customer can submit the biometric input, for example, by placing her finger on a fingerprint scanner. In another example, the customer can pronounce her name (and/or a payment amount) into a voice recognition mechanism. In some embodiments, the merchant POS system 120B can be a physical POS system. In some embodiments, the merchant POS system 120B can be an online POS system, such as an e-commerce website hosted by a server on behalf of the merchant.

Note that in the process 300, the merchant POS system 120B can be the same or different from the merchant POS system 120A discussed in the embodiment of FIG. 2. For example, the merchant POS system 120A may be a physical department store while the merchant POS system 120B may be an online coffee bean specialty store. In another example, the merchant POS system 120A in the process 200 is the same as the merchant POS system 120B at which the customer revisits, where the customer can simply pay using the identifier without having to provide a payment card in the second visit.

In addition to the user identifier, the merchant POS system 120B has information, or data, about the transaction ("transaction data"). For example, the merchant submits the transaction data to the merchant POS system 120B, where the transaction data includes the item(s) being purchased by the customer, the price(s) of the item(s), and the total transaction amount (i.e., payment amount). At block 302, the merchant POS system 120B transmits onto a network a payment request that includes the transaction data and the user identifier, for transmission to the PSS 110.

At block 303, the PSS 110 receives the transaction data and the user identifier. The PSS 110 can parse the payment request to determine, for example, a payment amount being requested and a user identifier to be used in processing the payment. At block 304, having determined the user identifier, the PSS 110 identifies a payment card based on the user identifier. In particular, the PSS 110 searches one or more databases (e.g., the databases 702, 704, and 706) to identify the user identifier and payment card data associated with the identifier. Once the PSS 110 has successfully determined the payment card associated with the user identifier, the PSS 110 can initiate a transfer of the payment amount from a financial account associated with the payment card to a financial account associated with the merchant POS system 120B to pay for the transaction. Initiating the transfer can include, for example, communicating with the customer (e.g., push notification, email, text message, etc.) to verify the transaction before causing monetary funds to be transferred, communicating with the merchant POS system 120B to verify the transaction (e.g., "Ok to accept identifier for payment?" "Fraud?" "Confirm?" etc.), and/or communicating with various intermediary financial entities (e.g., the card payment network) to transfer funds for the payment amount.

In some embodiments, the PSS 110 searches the one or more databases to identify contact information associated with the identifier to send a transaction confirmation request based on the contact information. In some embodiments, where the identifier provides the contact information (e.g., the identifier is an email address), the PSS 110 can send the transaction confirmation request to the customer based on that information.

At block 305, the PSS 110 sends a message to request confirmation of the transaction (i.e., the transaction confirmation request). As discussed above, the PSS 110 can send the transaction confirmation request to a telephone number, an email address, or a mobile application using a push notification service. The transaction confirmation request can be displayed on the mobile device 106 of the customer (e.g., as a text message, an email message, or a push notification). At block 306, the mobile device 106 receives the transaction confirmation request, and prompts the customer to confirm the payment for the transaction (i.e., block 307).

Figure 5A:
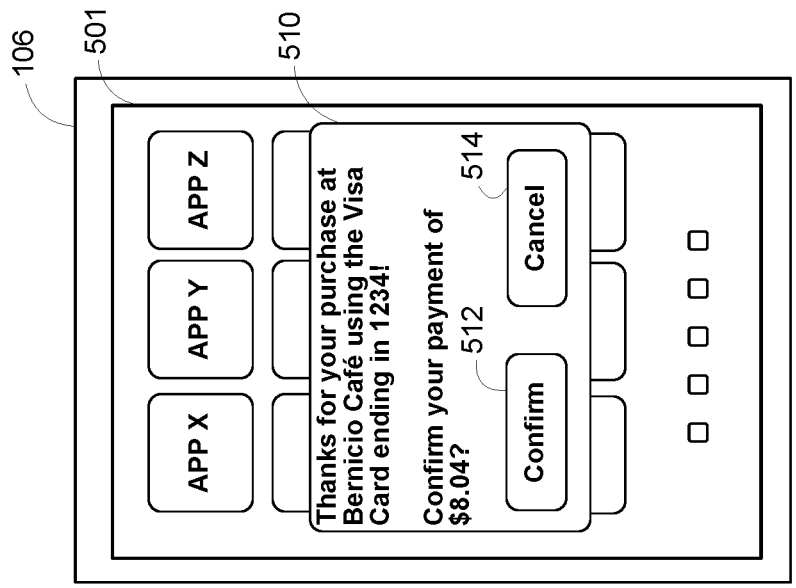
FIGS. 5A-5C are user interface diagrams illustrating examples of transaction confirmation messages that can be generated by a user's computing device to enable transaction verification.
Figure 5B:
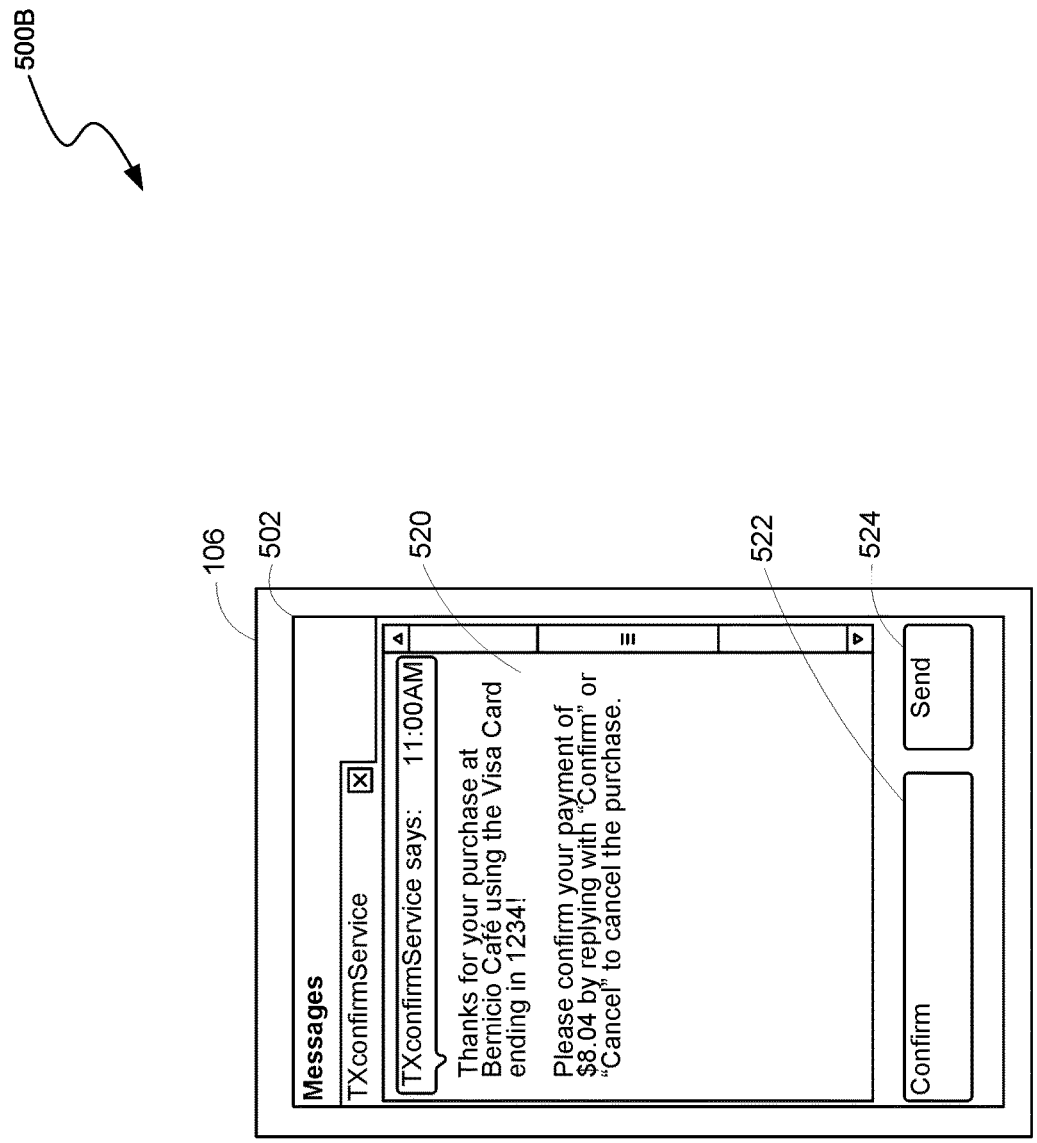
Figure 5C:
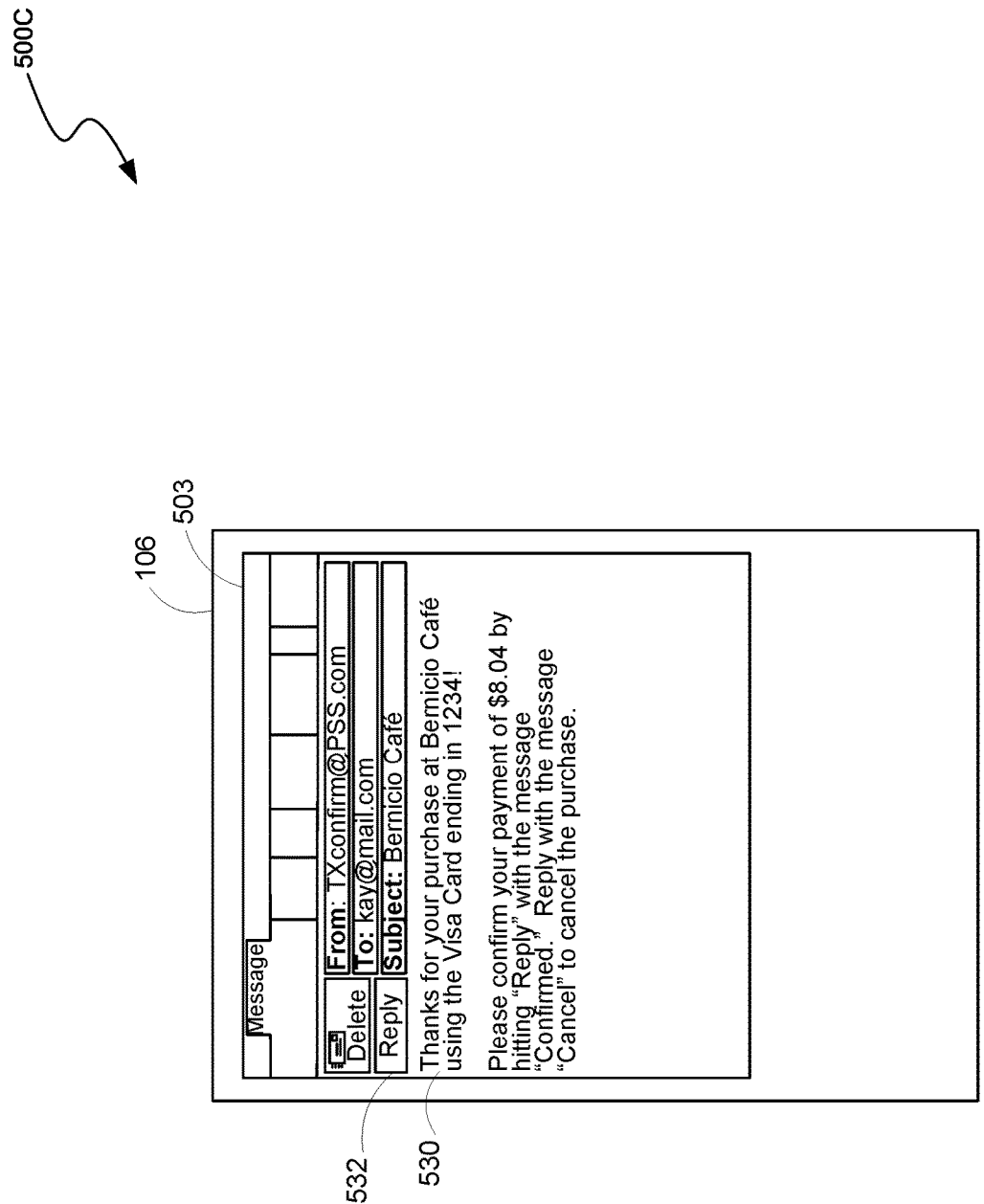

In some embodiments, within the mobile device 106, the transaction confirmation request is conveyed up through the various lower protocol layers to a mobile messaging application (hereinafter simply "messaging application") that is configured to recognize the transaction confirmation request, in accordance with the method used by the PSS 110 to send the request. The messaging application can be, for example, an email application or a text message application. In response to recognizing the request message, at block 307 the messaging application causes the mobile device 106 to display the transaction confirmation request to the customer, and to prompt the customer to indicate whether the customer wishes to confirm the payment, thereby verifying transaction is authentic, or cancel/end the payment for the transaction initiated at block 301. For example, the messaging application displays a text message sent by the PSS 110, as illustrated in FIG. 5B. In another example, the messaging application displays an email message, as illustrated in FIG. 5C.

In some embodiments, the mobile payment application 108 ("payment application 108") is installed on the mobile device 106, where the payment application 108 is associated with the PSS to facilitate the transaction confirmation request. In such embodiments, the transaction confirmation request is conveyed up through the various lower protocol layers to the payment application 108 that is configured to recognize the request. In response to recognizing this request message, at block 215 the payment application 108 causes the mobile device 106 to display the transaction confirmation request to the customer, and to prompt the customer to indicate whether the customer wishes to confirm the payment, thereby verifying transaction is authentic, or cancel/end the payment for the transaction initiated at block 301. For example, the payment application 108 displays a push notification displaying the transaction confirmation request, as illustrated in FIG. 5A.

At decision block 308, the payment application 108 (or the messaging application) installed on the mobile device 106 receives the customer's input in response to the prompt at block 307. If the customer's input indicates the customer does not confirm (e.g., customer selects "Cancel" within the push notification), the process 300 ends. If the input indicates the customer has confirmed (e.g., customer swipes to confirm within the push notification), the process 300 proceeds to block 309.

At block 309, the payment application 108 (or the messaging application) causes the mobile device 106 to send a message indicating confirmation by the customer, for transmission to the PSS 110 via the wireless network. At block 310, the PSS 110 receives the message from the mobile device 106 indicating that the payment has been confirmed, thereby indicating the transaction has been approved by the customer (i.e., the transaction is verified to be authentic). At block 311, in response to the customer's confirmation (i.e., the customer's approval of the payment), the PSS 110 executes a transaction authorization process using the transaction data. The transaction authorization process can be executed by the PSS 110 directly or through one or more intermediary entities. For example, the PSS 110 processes the payment request from the merchant POS system 120B by sending an authorization request to the issuer of the payment card via the acquirer and the card payment network. Upon receiving successful transaction authorization, the PSS approves the transaction at block 311. For the sake of simplicity, the scenario in which the transaction is denied is not discussed here, since it is not germane to the technique being introduced here.

In response to the transaction being approved, the PSS 110 performs at least two operations. At block 312, the PSS 110 executes or initiates a process to transfer a payment from a financial account associated with the customer to a financial account associated with the merchant POS system 120B. At block 312, the PSS 110 sends onto the network a transaction approval message for transmission to the merchant POS system 120B.

At block 312, the merchant POS system 120B receives the transaction approval message sent by the PSS 110 in block 312. At block 314, in response to the message, the merchant POS system 120B outputs a conventional transaction approval indication to the merchant. The indication may be in the form of, for example, a printed paper receipt, a message displayed on a display device, or a combination thereof. In some embodiments, the PSS 110 can generate and send an electronic receipt to the mobile device 106 of the customer in response to the transaction being approved at block 311.

FIG. 4A is a user interface diagram illustrating an example of an identifier confirmation message in the form of a text message that can be generated for display by a user's computing device to enable identifier verification. For example, the transaction verification system 112 generates a text message to be sent and received by the mobile device 106, which can output a display 401 such as illustrated in FIG. 4A. In the display 401, the customer is shown a text message 410 that prompts the customer to verify the identifier (e.g., telephone number) submitted in the transaction (e.g., service at Alexis Salon) where the customer's payment card (e.g., a card issued by MasterCard ending in "1234") has been used. The customer can confirm the identifier by inputting a text message "Confirm" into the text input field 412 and click the "Send" button 414 to verify that the identifier used in the transaction belongs to the customer. Once the identifier is confirmed, the customer can receive additional services, such as receiving a receipt for the transaction at Alexis Salon. As discussed above, the text message is sent to the customer's mobile device 106 based on a telephone number submitted by the customer. The telephone number can either be the identifier or contact information provided (in addition to the identifier) by the customer at the user interface of the POS system 120.

FIG. 4B is a user interface diagram illustrating an example of an identifier confirmation message in the form of an email that can be generated for display by a user's computing device to enable identifier verification. For example, the transaction verification system 112 generates an email message 420 to be sent and received by the mobile device 106, which can output a display 402 such as illustrated in FIG. 4B. In the display 402, the customer is shown the email message 420 that prompts the customer to confirm the identifier (e.g., email address) submitted in a transaction (e.g., service at Alexis Salon), where the customer's payment card (e.g., a card issued by MasterCard ending in "1234") has been used. The customer can confirm the identifier by hitting the "Reply" button 422 with an email message "Confirm" to verify that the identifier used in the transaction belongs to the customer. Once the identifier is confirmed, the customer can receive additional services, such as receiving a receipt for the transaction at Alexis Salon. As discussed above, the email message is sent to the customer's mobile device 106 based on an email address submitted by the customer. The email address can either be the identifier or contact information provided (in addition to the identifier) by the customer at the user interface of the POS system 120.

FIG. 5A is a user interface diagram illustrating an example of a transaction confirmation message in the form of a push notification that can be generated for display by a user's computing device to enable transaction verification. For example, the transaction verification system 112 and/or the PSS 110 generates a push notification message 510 to be sent and received by a mobile application installed on the mobile device 106, which can output a display 501 such as illustrated in FIG. 5A. In the display 501, the customer is shown the push notification message 510 that prompts the customer to verify a payment transaction (e.g., purchase at Bernicio Café), where the customer has submitted to the merchant an identifier, in lieu of a payment card and/or payment card information, to pay for the purchase. As discussed above, in response to the customer's submission of the identifier, the push notification message 510 is sent to the customer using contact information associated with the identifier, such as a device ID identifying the mobile device 106. In some embodiments, the push notification message 510 is sent using the identifier itself (e.g., the identifier is a device ID). The customer can confirm the purchase by selecting a "Confirm" button 512, thereby verifying that the payment transaction is authentic (i.e., authorized by the customer). Alternatively, the customer can choose to cancel the payment transaction by selecting a "Cancel" button 514. If the customer selects the "Confirm" button 512, the payment transaction is verified. Then, the payment service system 110 and/or the transaction verification system 112 can execute and/or trigger a process to transfer a payment amount from the customer's financial account to the merchant's financial account.

FIG. 5B is a user interface diagram illustrating an example of a transaction confirmation message in the form of a text message that can be generated for display by a user's computing device to enable transaction verification. For example, the transaction verification system 112 and/or the PSS 110 generates a text message 520 to be sent and received by the mobile device 106, which can output a display 502 such as illustrated in FIG. 5B. In the display 502, the customer is shown the text message 520 that prompts the customer to verify a payment transaction (e.g., purchase at Bernicio Café), where the customer has submitted to the merchant an identifier, in lieu of a payment card and/or payment card information, to pay for the purchase. As discussed above, in response to the customer's submission of the identifier, the text message 520 is sent to the customer using contact information associated with the identifier. In some embodiments, the text message 520 is sent using the identifier itself (e.g., the identifier is a telephone number). The customer can confirm the purchase by inputting a text message "Confirm" into the text input field 522 and click the "Send" button 524, thereby verifying that the payment transaction is authentic (i.e., authorized by the customer). Once the payment transaction is confirmed by the customer, the transaction verification system 112 and/or the PSS 110 can execute and/or trigger a process to transfer a payment amount from the customer's financial account to the merchant's financial account.

FIG. 5C is a user interface diagram illustrating an example of a transaction confirmation message in the form of an email that can be generated for display by a user's computing device to enable transaction verification. For example, the transaction verification system 112 and/or the PSS 110 generates an email message 530 to be sent and received by the mobile device 106, which can output a display 503 such as illustrated in FIG. 5C. In the display 503, the customer is shown the email message 530 that prompts the customer to verify a payment transaction (e.g., purchase at Bernicio Café), where the customer has submitted to the merchant an identifier, in lieu of a payment card and/or payment card information, to pay for the purchase. As discussed above, in response to the customer's submission of the identifier, the email message 530 is sent to the customer using contact information associated with the identifier. In some embodiments, the email message 530 is sent using the identifier itself (e.g., the identifier is an email address). The customer can confirm the purchase by hitting the "Reply" button 532 to send an email message "Confirm" to the transaction verification system 112 and/or the PSS 110, thereby verifying that the payment transaction is authentic (i.e., authorized by the customer). Once the payment transaction is confirmed by the customer, the transaction verification system 112 and/or the PSS 110 can execute and/or trigger (or initiate) a process to transfer a payment amount from the customer's financial account to the merchant's financial account.

Figure 6:
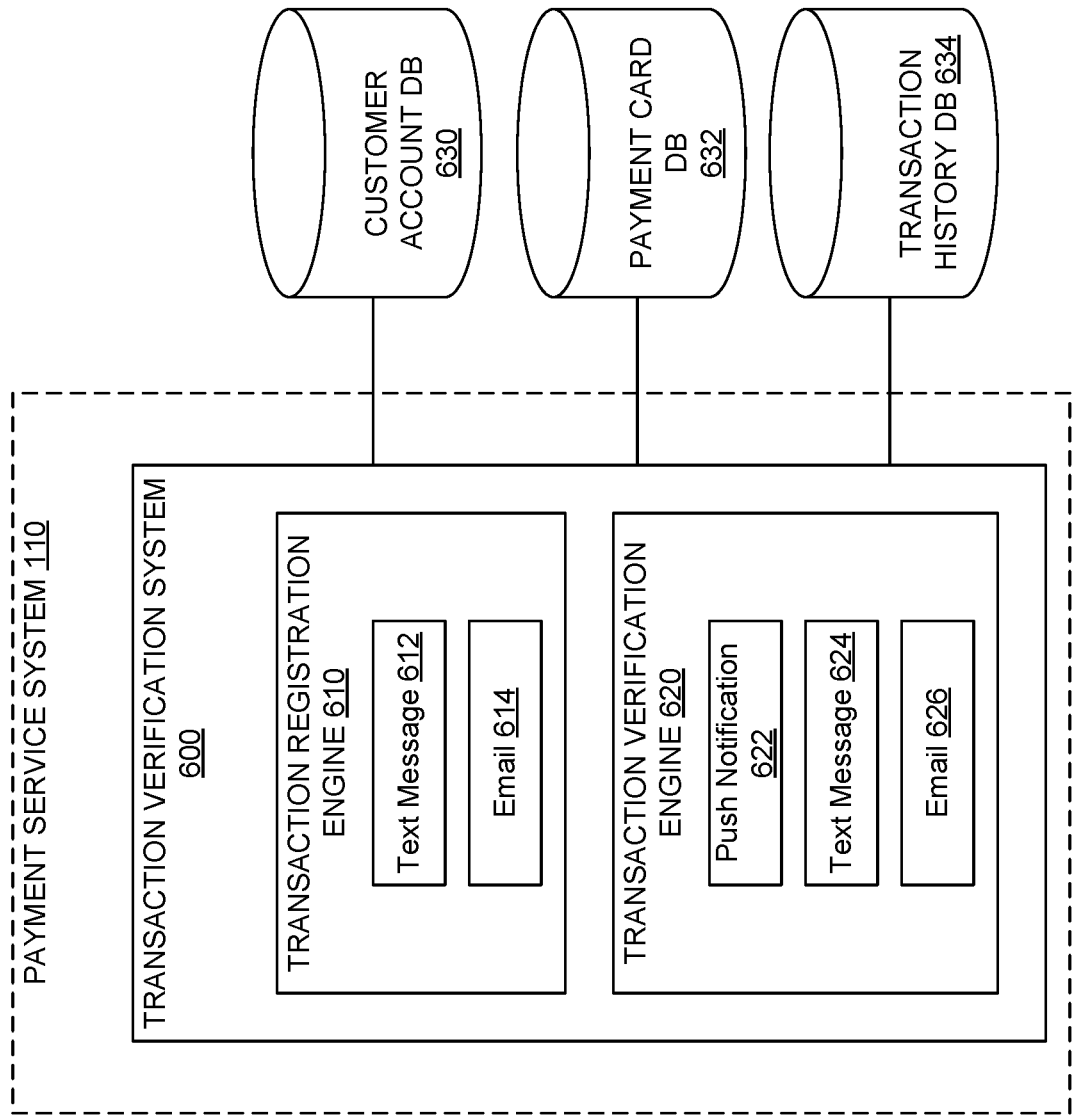
FIG. 6 is a block diagram illustrating various components of an example transaction verification system that can be used in verifying and processing a transaction.

FIG. 6 is a block diagram illustrating various components of an example transaction verification system 600 ("system 600") that can be used in verifying and processing a transaction. In some embodiments, the system 600 can be the transaction verification system 112 of FIG. 1, where the system 600 can be a component or sub-system of the payment service system 110 of FIG. 1. Alternatively, the system 600 can be implemented on a separate computing system (e.g., on a separate server or server(s)).

The system 600 can include a transaction registration engine 610 and a transaction verification engine 620, among others. The transaction registration engine 610 and the transaction verification engine 620 can each access one or more database tables from a customer account database 630, a payment card database 632, and/or a transaction history database 634 to retrieve and/or store data.

The transaction registration engine 610 is triggered whenever a swiping transaction occurs at a POS device associated with a POS system of a merchant. In particular, the system 600 receives (a) payment card information as a result of the swipe and (b) contact information associated with the customer. The contact information can be provided by the customer at a user interface of the POS device. The contact information can be, for example, an email address of the customer. As discussed above, in some embodiments, the customer can also provide an identifier at the user interface of the POS device. The identifier can be, for example, a user-generated identifier created by the customer (e.g., sally1234).

Using the payment card information, the contact information, and/or the identifier, the transaction registration engine 610 checks one or more database tables, such as database table 702 of FIG. 7 stored, e.g., in a customer account database 630, and the payment card database tables 704, 706 of FIG. 7 stored, e.g., in a payment card database 632, to determine whether a new payment service account should be registered on behalf of the customer associated with the swiping transaction. For example, if a payment service account associated with the email address and the payment card information already exists in the database tables, a new payment service account will not be created. In another example, if the payment card that is stored in association with the email address in the database table 704 is different from the payment card used in the swiping transaction, then the transaction registration module 610 can create a new payment card record associating the payment card used in the swiping transaction with the email address in the database table 704. Further, the transaction registration module 610 can create a new record associating the email address with the identifier in the database table 702. In this manner, a customer's payment service account can have one email address associated with multiple payment cards and one identifier associated with the multiple payment cards.

In yet another example, if the payment card, the email address, and the identifier from the swiping transaction are not stored at all in any of the database tables 702, 704, 706, then the transaction registration module 610 can create a new payment card record associating the payment card used in the swiping transaction with the email address in the database table 704. Further, the transaction registration module 610 can create a new record associating the email address with the identifier in the database table 702.

In some embodiments, the customer can provide his/her contact information in the form of a telephone number (as opposed to an email address). In such embodiments, the transaction registration module 610 checks the one or more database tables for the telephone number in association with the payment card (and/or in association with the identifier) in order to determine whether a new payment service account should be registered for the customer associated with the swiping transaction.

In some embodiments, prior to storing the identifier, the transaction registration engine 610 verifies whether the identifier truly belongs to the customer. In such embodiments, the transaction registration engine 610 sends a confirmation message request to the customer using the customer's submitted contact information. For example, the transaction registration engine 610 sends a text message 612 (e.g., "Please confirm "sally1234" is your identifier") to the telephone number for display on a computing device of the customer (e.g., a smartphone). In the example, the customer can confirm the identifier by replying with another text message, e.g., "Yes." In another example, the transaction registration engine 610 sends an email 614 (e.g., "Please confirm "sally1234" is your identifier") to the email address for display on a computing device of the customer. In such example, the customer can confirm the identifier by replying with another email message, e.g., "Yes." Once the transaction registration engine 610 receives the reply message indicating the customer has confirmed the identifier, the transaction registration engine 610 changes the customer account status to "Verified." Otherwise, the account status remains "Unverified."

The registration verification module 620 can verify payment service accounts created on behalf of customers by various methods described with reference to FIG. 3. In other words, the registration verification module 620 can be configured to send a transaction confirmation request via a push notification 622, an email 624, a text message 626, or any other suitable communication channel to request a customer to verify his/her transaction (in which the identifier is used) by providing a reply response through the same medium with which the transaction confirmation request has been sent.

Once the registration verification module 620 receives the reply response confirming the transaction, the registration verification module 620 approves the transaction. In some embodiments, the registration verification module 620 communicates the approval status to the payment service system 110, which executes or triggers the transfer of a payment amount from the customer's financial account to the merchant's financial account. In some embodiments, the registration verification module 620 itself executes or triggers the transfer of a payment amount from the customer's financial account to the merchant's financial account.

One or more components and/or modules of the system 600 can be implemented on the merchant POS device 122 of FIG. 1, e.g., in a mobile payment application installed on the merchant POS device 122, such as the mobile payment application 108. Likewise, one or more components and/or modules of the system 600 can be implemented on the mobile device 106 of FIG. 1, e.g., in the mobile payment application 108 installed on the mobile device 106. Additionally, in various embodiments, the functionality of the merchant POS device 122 and the transaction verification system 600 can be implemented in a single device or co-located (e.g., at a merchant's location).

FIG. 7 are examples of database tables coupled to the system of FIG. 6 for use in verifying and processing the transaction. The customer account database table 702 can include various fields of information such as, but not limited to: customer ID1 (e.g., email address), customer ID2 (e.g., telephone number), customer ID3 (e.g., device identifier), customer ID4 (e.g., user-generated identifier), first name, last name, and/or the like. In some embodiments, the customer account database table 702 can include billing address, shipping address, and/or the like.

The payment card database tables 704, 706 can each include various fields of information such as, but not limited to: customer ID1 or customer ID2 or a combination thereof, payment card number, issuer, expiration date, billing address, verification status, and/or the like.

Figure 8:
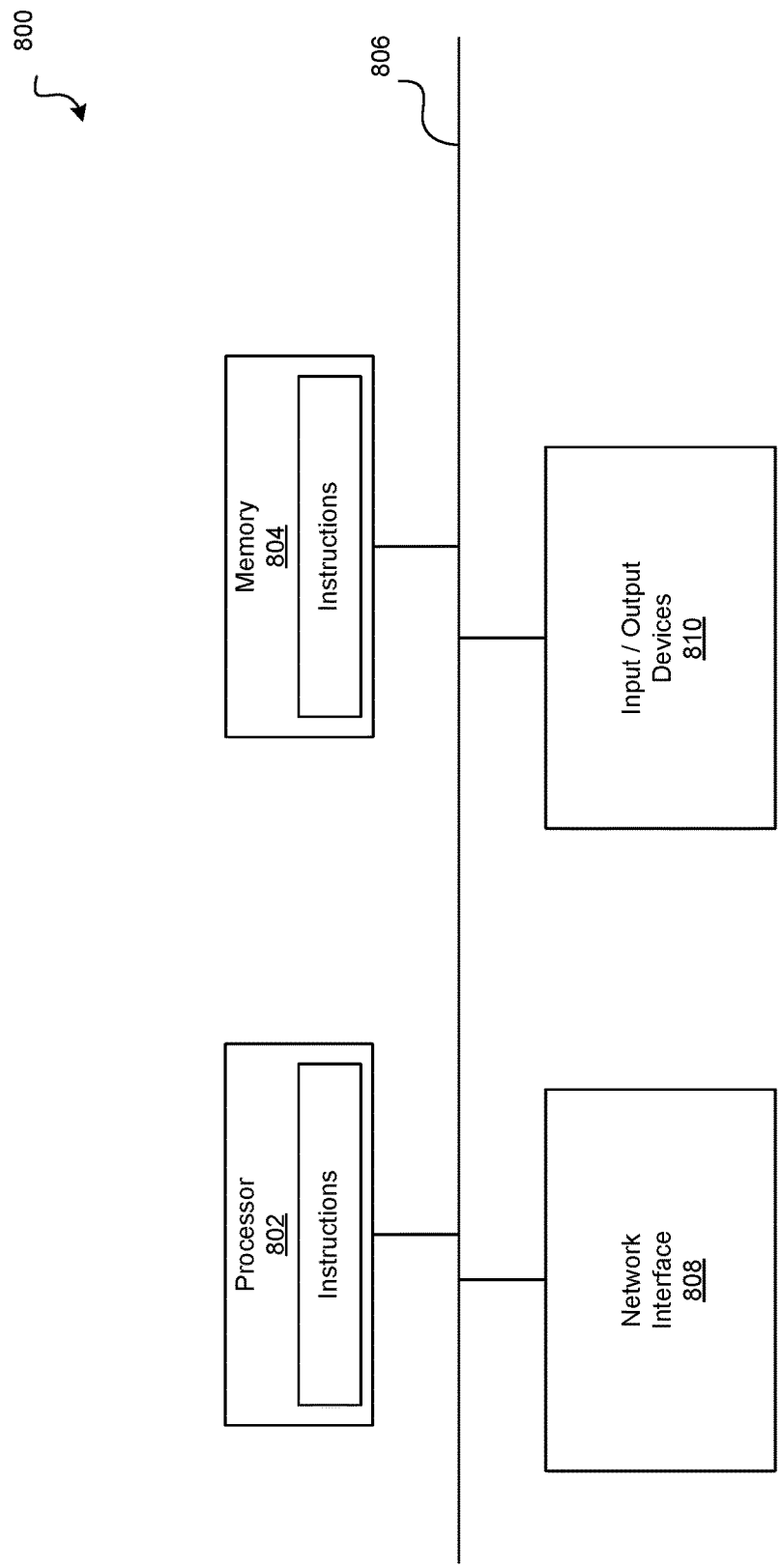
FIG. 8 is a high-level block diagram illustrating an example of a processing device in which at least some operations related to the disclosed technology can be implemented.

FIG. 8 is a high-level block diagram illustrating an example of a processing device 800 that can represent any of the devices described above, such as the POS device 122, the POS system 120, the payment service system 110, the transaction verification 112, and/or the financial system 130, in which at least some operations related to the disclosed technology can be implemented. In alternative embodiments, the processing device operates as a standalone device or can be connected (e.g., networked) to other processing devices. In a networked deployment, the processing device can operate in the capacity of a server or a client computer in a client-server network environment, or as a peer computer in a peer-to-peer (or distributed) network environment.

The processing device 800 can be a server computer, a client computer, a personal computer (PC), a mobile electronic user device, a tablet PC, a laptop computer, a set-top box (STB), a personal digital assistant (PDA), a cellular telephone or a smart phone (e.g., an iPhone or an Android phone), a web-enabled household appliance, a network router, switch or bridge, a (hand-held) gaming device, a music player, or any computer capable of executing a set of instructions (sequential or otherwise) that specify actions to be taken by that computer.

In the illustrated embodiment, the processing device 800 includes one or more processors 802, one or more memories 804, a network interface device 808, and one or more input/output devices (I/O) devices 810, all coupled to each other through an interconnect 806. The interconnect 806 can be or include one or more conductive traces, buses, point-to-point connections, controllers, adapters and/or other conventional connection devices.

The processor(s) 802 can be or include, for example, one or more general purpose programmable microprocessors, microcontrollers, application specific integrated circuits (ASICs), programmable gate arrays, or the like, or a combination of such devices. The processor(s) 802 control the overall operation of the processing device 800.

The one or more memor(ies) 804 can be or include one or more physical storage devices, which can be in the form of random access memory (RAM), read-only memory (ROM) (which can be erasable and programmable), flash memory, miniature hard disk drive, or other suitable type of storage device, or a combination of such devices. The one or more memor(ies) 804 can store data and instructions that configure the processor(s) 802 to execute operations in accordance with the techniques described above.

While the computer-readable medium or computer-readable storage medium is shown in an exemplary embodiment to be a single medium, the term "computer-readable medium" and "computer-readable storage medium" should be taken to include a single medium or multiple media (e.g., a centralized or distributed database, and/or associated caches and servers) that store the one or more sets of instructions. The term "computer-readable medium" and "computer-readable storage medium" shall also be taken to include any medium that is capable of storing, encoding or carrying a set of instructions for execution by the computer and that cause the computer to perform any one or more of the methodologies of the presently disclosed technique and innovation.

In general, the routines executed to implement the embodiments of the disclosed technology, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of computer-readable storage media, computer-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device 808 enables the computer to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

While some aspects of the disclosure are presented below in some claim forms, the inventors contemplate the various aspects of the disclosure in any number of claim forms. Accordingly, the applicant reserves the right to add additional claims after filing the application to pursue such additional claim forms for other aspects of the disclosure.

What is claimed is:

1. A system comprising one or more computers and one or more storage devices storing instructions that are operable, when executed by the one or more computers, to cause the one or more computers to perform operations comprising:

receiving, from a point-of-sale (POS) system associated with a merchant, transaction data associated with a transaction, the transaction data including an identifier of a customer and a payment amount of the transaction, wherein the identifier of the customer comprises at least one of a user-generated identifier, an email address of the customer, or a biometric identifier of the customer;
sending a message to a customer device based at least in part on receiving the identifier of the customer, the message requesting confirmation that the customer has provided the identifier and that the identifier is what the customer intended;
receiving user input data responsive to the message;
verifying that the identifier is associated with the customer based at least in part on the user input data;
storing, based at least in part on verifying that the identifier is associated with the customer, the identifier in a database such that the identifier is configured to be utilized at merchants to initiate payment for a merchant transaction at the merchants;
accessing, based at least in part on receiving the identifier associated with the customer, the database, wherein the database includes associations between identifiers of customers and financial information associated with financial instruments;
determining, based at least in part on accessing the associations in the database, an association between the identifier of the customer and first financial information associated with a first financial instrument of the financial instruments;
sending, to a user device of the customer, and based on determining the association between the identifier of the customer and the first financial information, a first request to confirm that the first financial information is to be used for the transaction;
receiving, from the user device, a first confirmation that the first financial information is to be used for the transaction; and
initiating, based at least in part on receiving the first confirmation, a transfer of the payment amount from a first financial account associated with the first financial information to a second financial account associated with the merchant to pay for the transaction.

2. The system of claim 1, the operations further comprising:
receiving, prior to receiving the transaction data and from at least one alternate POS system associated with at least one alternate merchant, different transaction data, the different transaction data including the identifier and the first financial information; and
associating the identifier and the first financial information in the database.

3. The system of claim 2, the operations further comprising:
sending a second request that the identifier is to be associated with the first financial information;
receiving a second confirmation that the identifier is to be associated with the first financial information; and
associating the identifier and the first financial information in the database based on the second confirmation.

4. The system of claim 1, wherein initiating the transfer of the payment amount from the first financial account to the second financial account is initiated based at least in part on the first confirmation.

5. A method implemented by one or more servers of a payment processing service, the method comprising:
receiving, from a first point-of-sale (POS) system associated with a first merchant, transaction data associated with a transaction, the transaction data including an identifier of a customer and a payment amount of the transaction, wherein the identifier of the customer comprises at least one of a user-generated identifier, an email address of the customer, or a biometric identifier of the customer;
sending a message to a customer device based at least in part on receiving the identifier of the customer, the message requesting confirmation that the customer has provided the identifier and that the identifier is what the customer intended;
receiving user input data responsive to the message;
verifying that the identifier is associated with the customer based at least in part on the user input data;
saving, based at least in part on verifying that the identifier is associated with the customer, the identifier in a database such that the identifier is utilizable to initiate payment for a merchant transaction at the merchants;
accessing, based at least in part on receiving the identifier associated with the customer, the database, wherein the database includes associations between identifiers of customers and financial information associated with financial instruments;
determining, based at least in part on accessing the associations in the database, an association between the identifier of the customer and first information associated with a first financial instrument of the financial instruments;
sending, based on determining the association between the identifier of the customer and the first information, a request to confirm that the first information is to be used for the transaction;
receiving a confirmation that the first information is to be used for the transaction; and
initiating a transfer of the payment amount from a first financial account associated with the first information to a second financial account associated with the first merchant to pay for the transaction.

6. The method of claim 5, wherein the identifier was previously provided by the customer via a user interface presented by a second POS system associated with a second merchant.

7. The system of claim 1, wherein the first financial instrument is a conventional credit card, a conventional debit card, a smartcard, a biometrically identifiable instrument, or a virtual wallet.

8. The system of claim 1, wherein the POS system is a physical POS system or an online POS system.

9. The system of claim 1, wherein the association between the identifier and the first financial information corresponds to another transaction conducted at another POS system, and wherein the POS system and the other POS system are different POS systems.

10. The system of claim 1, wherein the association between the identifier and the first financial information corresponds to another transaction conducted at another POS system, and wherein the POS system and the other POS system are a same POS system.

11. The method of claim 5, wherein the first financial instrument is a conventional credit card, a conventional debit card, a smartcard, a biometrically identifiable instrument, or a virtual wallet.

12. The method of claim 5, further comprising:
receiving, prior to receiving the transaction data and from a second POS system associated with a second merchant, different transaction data, the different transaction data including the identifier and the first information; and
associating the identifier and the first information in the database.

13. The method of claim 5, further comprising:
sending a second request that the identifier is to be associated with the first information;
receiving a second confirmation that the identifier is to be associated with the first information; and
associating the identifier and the first information in the database based on the second confirmation.

14. The method of claim 5, wherein initiating the transfer of the payment amount from the first financial account to the second financial account is initiated based at least in part on the confirmation.

15. The method of claim 5, wherein initiating the transfer of the payment amount from the first financial account to the second financial account is initiated without the first information being provided at the POS system.

16. One or more non-transitory computer-readable media storing computer executable instructions that, when executed by one or more processors, program the one or more processors to perform acts comprising:
receiving, from a first point-of-sale (POS) system associated with a first merchant, transaction data associated with a transaction, the transaction data including an identifier of a customer and a payment amount of the transaction, wherein the identifier of the customer comprises at least one of a user-generated identifier, an email address of the customer, or a biometric identifier of the customer;
sending a message to a customer device based at least in part on receiving the identifier of the customer, the message requesting confirmation that the customer has provided the identifier and that the identifier is what the customer intended;
receiving user input data responsive to the message;
verifying that the identifier is associated with the customer based at least in part on the user input data;
storing, based at least in part on verifying that the identifier is associated with the customer, the identifier in a database, the database configured to be queried by merchant devices to initiate payment for a merchant transaction at the merchant devices;
accessing, based at least in part on receiving the identifier associated with the customer, the database, wherein the database includes associations between identifiers of customers and financial information associated with financial instruments;
determining, based at least in part on accessing the associations in the database, an association between the identifier of the customer and first financial information associated with a financial instrument of the financial instruments;
sending based on determining the association between the identifier of the customer and the financial information, a request to confirm that the financial information is to be used for the transaction;
receiving a confirmation that the first financial information is to be used for the transaction; and
initiating a transfer of the payment amount from a first financial account associated with the first financial information to a second financial account associated with the first merchant to pay for the transaction.

17. The one or more non-transitory computer-readable media of claim 16, wherein the identifier was previously provided by the customer via a user interface presented by a second POS system associated with a second merchant.

18. The system of claim 1, wherein the biometric identifier comprises input associated with a voice of the customer, a face of the customer, a fingerprint of the customer, a heartbeat of the customer, or an iris of the customer.

19. The method of claim 5, wherein the biometric identifier comprises input associated with a voice of the customer, a face of the customer, a fingerprint of the customer, a heartbeat of the customer, or an iris of the customer.

20. The one or more non-transitory computer-readable media of claim 16, wherein the biometric identifier comprises input associated with a voice of the customer, a face of the customer, a fingerprint of the customer, a heartbeat of the customer, or an iris of the customer.

\* \* \* \* \*